US010551681B2

(12) United States Patent
Shimoshikiryoh et al.

(10) Patent No.: US 10,551,681 B2
(45) Date of Patent: Feb. 4, 2020

(54) LIQUID CRYSTAL PANEL AND METHOD OF MANUFACTURING THEREOF

(71) Applicant: SHARP KABUSHIKI KAISHA, Sakai, Osaka (JP)

(72) Inventors: Fumikazu Shimoshikiryoh, Sakai (JP); Shinichi Terashita, Sakai (JP); Kouichi Watanabe, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/366,911

(22) Filed: Mar. 27, 2019

(65) Prior Publication Data

US 2019/0302537 A1 Oct. 3, 2019

(30) Foreign Application Priority Data

Mar. 28, 2018 (JP) .................................. 2018-062303

(51) Int. Cl.
*G02F 1/1337* (2006.01)
*G02F 1/1343* (2006.01)
*G02F 1/1362* (2006.01)

(52) U.S. Cl.
CPC .. *G02F 1/133707* (2013.01); *G02F 1/133753* (2013.01); *G02F 1/133788* (2013.01); *G02F 1/134336* (2013.01); *G02F 1/136286* (2013.01); *G02F 2001/133757* (2013.01); *G02F 2201/121* (2013.01); *G02F 2201/123* (2013.01)

(58) Field of Classification Search
CPC ............... G02F 2001/133757; G02F 1/134309
See application file for complete search history.

(56) References Cited

U.S. PATENT DOCUMENTS

| 2011/0141423 | A1* | 6/2011 | Cheng | G02F 1/133707 349/141 |
| 2015/0036073 | A1 | 2/2015 | Im et al. | |
| 2015/0234239 | A1* | 8/2015 | Son | G02F 1/133753 349/33 |
| 2017/0293185 | A1* | 10/2017 | Park | G02F 1/133753 |

FOREIGN PATENT DOCUMENTS

JP 2015-031961 A 2/2015

* cited by examiner

*Primary Examiner* — Alexander P Gross
(74) *Attorney, Agent, or Firm* — ScienBiziP, P.C.

(57) ABSTRACT

A liquid crystal panel includes: a first substrate including multiple pixel electrodes; a liquid crystal layer; and a second substrate. The domains in the display unit region located in an nth row are arranged in an order of a first domain, a second domain, a third domain, and a fourth domain. Each of the pixel electrodes is provided with multiple fine slits parallel to the alignment vectors of the respective domains. Each of the pixel electrodes includes a region where the fine slits do not exist, at both ends of the pixel electrode parallel to the row direction and at one or both of ends of the pixel electrode parallel to the column direction. A portion having a largest width of the region where the fine slits do not exist is included in one or both of the ends of the pixel electrode parallel to the row direction.

10 Claims, 31 Drawing Sheets

TFT substrate

| First time | Second time | Third time | Fourth time | Combined |
|---|---|---|---|---|
| 10a ↘ 253 | 10a | 10a | 10a | 10a ↘ |
| 10b | 10b | 10b ↙ 253 | 10b | 10b ↙ |
| 10c | 10c ↙ | 10c | 10c | 10c ↙ |
| 10d | 10d | 10d | 10d ↖ 253 | 10d ↖ |

CF substrate

| First time | Second time | Third time | Fourth time | Combined |
|---|---|---|---|---|
| 10a | 10a | 10a | 10a ↗ 254 | 10a ↗ |
| 10b | 10b ↘ 254 | 10b | 10b | 10b ↘ |
| 10c | 10c | 10c ↖ | 10c | 10c ↖ |
| 10d ↙ 254 | 10d | 10d | 10d | 10d ↙ |

TFT/CF superposed

Liquid crystal panel is not bent

Dark line of type A

Alignment controlling region of domain IV on CF substrate side

Black matrix (light shielding body)

CF substrate

Liquid crystal layer

TFT substrate

Alignment controlling region of domain IV on TFT substrate side

Liquid crystal panel is not bent

Dark line of type A

Dark line of type A
Dark line of type B

Dark line of type A

Dark line of type B

Liquid crystal panel is not bent

Dark line of type A

Liquid crystal panel is not bent

Dark line of type A

Alignment controlling region of domain IV on CF substrate side

Black matrix (light shielding body)

CF substrate

Liquid crystal layer

TFT substrate

Alignment controlling region of domain IV on TFT substrate side

Dark line of type A

Dark line of type A

LIQUID CRYSTAL PANEL AND METHOD OF MANUFACTURING THEREOF

CROSS-REFERENCE TO RELATED APPLICATIONS

The present application claims priority under 35 U.S.C. § 119 to Japanese Patent Application No. 2018-062303 filed on Mar. 28, 2018, the contents of which are incorporated herein by reference in their entirety.

BACKGROUND OF THE INVENTION

Field of the Invention

The present invention relates to a liquid crystal panel and a method of manufacturing thereof. More particularly, the present invention relates to a liquid crystal panel having a configuration in which one pixel is divided into multiple alignment regions (domains) and a method suitable for manufacturing of the liquid crystal panel.

Description of Related Art

A liquid crystal display device is a display device in which a liquid crystal composition is used to perform display. In a typical display system for the liquid crystal display device, the liquid crystal composition enclosed between a pair of substrates is irradiated with light from a backlight, and voltage is applied to the liquid crystal composition to change alignment of liquid crystal molecules, thereby controlling an amount of light transmitted through the liquid crystal panel. Because the liquid crystal display device has the features such as a low profile, light weight, and low power consumption, the liquid crystal display device is used in electronic products such as a smartphone, a tablet PC, and an automotive navigation system.

Conventionally, an alignment division technique has been studied. In the alignment division technique, one pixel is divided into multiple alignment regions (domains), and the liquid crystal molecules are aligned at different azimuths in different alignment regions, thereby improving a viewing angle characteristic. JP 2015-31961 A can be cited as an example of a citation list disclosing the alignment division technique.

A liquid crystal display device disclosed in JP 2015-31961 A includes: a display substrate that includes multiple pixel regions and has a curved shape bent according to a first direction; a counter substrate that is opposed and coupled to the display substrate and has a curved shape together with the display substrate; and a liquid crystal layer disposed between the display substrate and the counter substrate. In the liquid crystal display device, multiple domains are defined in each of the pixel regions, at least two of the domains are different from each other in a direction in which liquid crystal molecules of the liquid crystal layer are aligned, and the domains are arrayed in a second direction crossing the first direction.

BRIEF SUMMARY OF THE INVENTION

Sometimes display unevenness having a viewing angle characteristic is generated in the liquid crystal panel in which the alignment division technique is used. Because the display unevenness has the viewing angle characteristic, the display unevenness can hardly be suppressed by a publicly known conventional unevenness correction technique. For this reason, there is a demand for a method of suppressing the display unevenness having the viewing angle characteristic.

The present invention has been made in view of such a current state of the art and aims to provide a liquid crystal panel in which the display unevenness having viewing angle dependency is suppressed and a method suitable for manufacturing of the liquid crystal panel.

As a result of extensive studies on the cause of occurrence of display unevenness having viewing angle dependency, the inventors have found that in the case that a fine slit is provided in a pixel electrode, an electric field from the gate line below the pixel electrode influences the liquid crystal Layer to change luminance of the liquid crystal panel. In the liquid crystal panel in which one pixel is divided into alignment regions (domains), the inventors have also found that display unevenness having viewing angle dependency is generated because a degree of influence of the electric field from the gate line varies between the domains. Thereby, the inventors have arrived at the solution to the above problem when a distance from to an end of a fine slit to an end of the pixel electrode is lengthened in the domain close to the gate line, completing the present invention.

According to one aspect of the present invention, there is provided a liquid crystal panel including: a first substrate including multiple pixel electrodes arranged into a matrix form, multiple gate lines, and a first alignment film; a liquid crystal layer containing liquid crystal molecules; and a second substrate including a common electrode and a second alignment film, wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include multiple domains with different alignment vectors in a column direction in each display unit region superimposed on one of the pixel electrodes, in at least 30 pixels consecutive in a row direction, arrays of the domains are identical, the gate lines extend through a region between rows of the display unit regions, the domains in the display unit region located in an nth row, where n is any integer of 1 or more, are arranged in an order of a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction, each of the pixel electrodes is provided, in the first domain, the second domain, the third domain, and the fourth domain, with multiple fine slits parallel to the alignment vectors of the respective domains, each of the pixel electrodes includes a region where the fine slits do not exist, at both ends of the pixel electrode parallel to the row direction and at one or both of ends of the pixel electrode parallel to the column direction, and a portion having a largest width of the region where the fine slits do not exist is included in one or both of the ends of the pixel electrode parallel to the row direction.

According to another aspect of the present invention, there is provided a method of manufacturing the liquid crystal panel, the method including forming the fine slits by photolithography, the photolithography including irradiating a photosensitive resin formed on a conductive film with light through a mask in which a pattern corresponding to the fine slits is formed and multiple lenses.

The present invention can provide the liquid crystal panel in which the display unevenness having the viewing angle dependency is suppressed and the method suitable for manufacturing of the liquid crystal panel.

BRIEF DESCRIPTION OF THE DRAWINGS

FIG. 5A illustrates a domain group that is not adjacent to the gate line G, and FIG. 5B illustrates a domain group adjacent to the gate line G;

FIG. 14A illustrates the state in which the liquid crystal panel is not bent, and FIG. 14B illustrates the state in which the liquid crystal panel is bent;

FIG. 15A is a plan view of the pixel, and FIG. 15B is a cross-sectional view taken along line A-A';

FIG. 16A is a plan view of the pixel, and FIG. 16B is a cross-sectional view taken along line A-A';

FIG. 17A is a plan view of the pixel, and FIG. 17B is a cross-sectional view taken along line A-A';

FIG. 18A illustrates the state in which the first conventional liquid crystal panel is not bent, and FIG. 18B illustrates the state in which the first conventional liquid crystal panel is bent;

FIG. 19A is a plan view of the pixel, and FIG. 19B is a cross-sectional view taken along line A-A';

FIG. 20A is a plan view of the pixel, and FIG. 20B is a cross-sectional view taken along line A-A';

FIG. 21A is a plan view of the pixel, and FIG. 21B is a cross-sectional view taken along line A-A';

FIG. 22A illustrates the state in which the second conventional liquid crystal panel is not bent, and FIG. 22B illustrates the state in which the second conventional liquid crystal panel is bent;

FIG. 23A is a plan view of the pixel, and FIG. 23B is a cross-sectional view taken along line A-A';

FIG. 24A is a plan view of the pixel, and FIG. 24B is a cross-sectional view taken along line A-A';

FIG. 25A is a plan view of the pixel, and FIG. 25B is a cross-sectional view taken along line A-A';

FIG. 26A illustrates the state in which the third conventional liquid crystal panel is not bent, and FIG. 26B illustrates the state in which the third conventional liquid crystal panel is bent;

FIG. 27A is a plan view of the pixel, and FIG. 27B is a cross-sectional view taken along line A-A';

FIG. 28A is a plan view of the pixel, and FIG. 28B is a cross-sectional view taken along line A-A'; FIG. 29A is a plan view of the pixel, and FIG. 29B is a cross-sectional view taken along line A-A'.

DETAILED DESCRIPTION OF THE INVENTION

Hereinafter, an embodiment of the present invention will be described. However, the following embodiment is not intended to limit the scope of the present invention, and appropriate modifications can be made within the spirit of the present invention.

Figure 1:
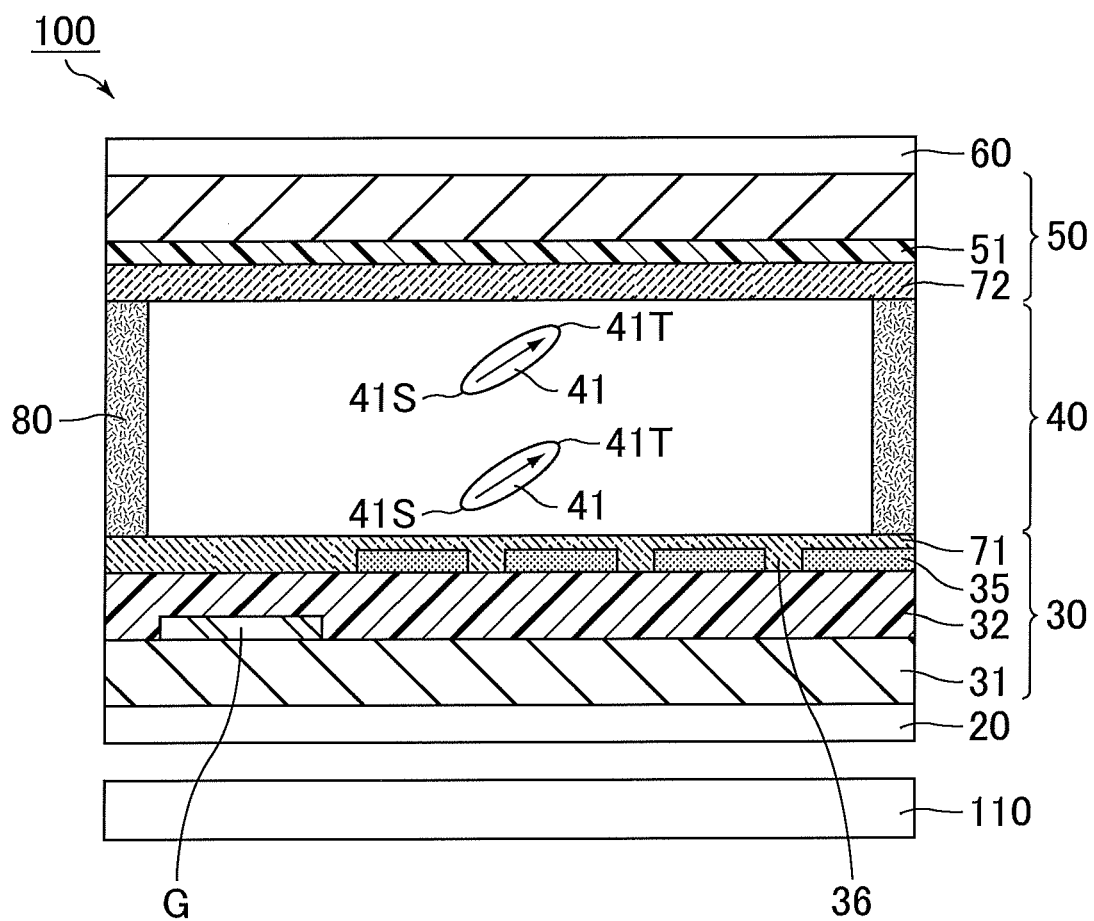
FIG. 1 is a cross-sectional view schematically illustrating an example of a liquid crystal display device according to an embodiment.

FIG. 1 is a cross-sectional view schematically illustrating an example of a liquid crystal display device according to an embodiment. As illustrated in FIG. 1, the liquid crystal display device of the embodiment includes a liquid crystal panel 100 and a backlight 110 disposed on a back side of the liquid crystal panel 100. The liquid crystal panel 100 includes a back-side polarizing plate 20, a first substrate 30 including multiple pixel electrodes 35 and a first alignment film 71, a liquid crystal layer 40 containing liquid crystal molecules 41, a second substrate 50 including a second alignment film 72 and a counter electrode (common electrode) 51, and a display-surface-side polarizing plate 60 in this order. The liquid crystal panel 100 includes a sealing material 80 around the liquid crystal layer 40.

A method of displaying the liquid crystal display device of the embodiment will be described. In the liquid crystal display device of the embodiment, light is incident on the liquid crystal panel 100 from the backlight 110, and an amount of light transmitted through the liquid crystal panel 100 is controlled by switching the alignment of the liquid crystal molecules 41 in the liquid crystal layer 40. The alignment of the liquid crystal molecules 41 is switched by applying voltage to the liquid crystal layer 40 using the multiple pixel electrodes 35 and the counter electrode 51. When the voltage applied to the liquid crystal layer 40 is less than a threshold (at time of applying no voltage), the initial alignment of the liquid crystal molecules 41 is controlled by the first alignment film 71 and the second alignment film 72.

At the time of applying no voltage, the liquid crystal molecules 41 are aligned substantially vertically to the first substrate 30 and the second substrate 50. As used herein, the term "substantially vertically" means that the liquid crystal molecules 41 are aligned slightly oblique to the first substrate 30 and the second substrate 50 by the alignment treatment performed on the first alignment film 71 and the second alignment film 72. A pre-tilt angle of the liquid crystal molecules 41 with respect to the first substrate 30 and the second substrate 50 at the time of applying no voltage is preferably greater than or equal to 85° and less than 90°. When the voltage is applied between the pixel electrode 35 and the counter electrode 51, a vertical electric field is generated in the liquid crystal layer 40, and the liquid crystal molecules 41 are further obliquely aligned while an oblique azimuth is maintained from the time of applying no voltage.

The oblique azimuth of the liquid crystal molecules 41 will be described as appropriate using an alignment vector in which in a plan view of the liquid crystal panel 100, a first substrate 30 side long-axis end of each liquid crystal molecule 41 is defined as a start point (hereinafter, also referred to as "a tail of a liquid crystal director") 41S while the second substrate 50 side long-axis end of the liquid crystal molecule 41 is defined as an end point (hereinafter also referred to as "a head of the liquid crystal director") 41T. The alignment vector is in the same direction as the oblique azimuth of the liquid crystal molecules 41 with respect to the first alignment film 71 on the side of the first substrate 30 and is in an opposite direction to the oblique azimuth of the liquid crystal molecules 41 with respect to the second alignment film 72 on the side of the second substrate 50. As used herein, the term "azimuth" means a direction in a view projected onto a substrate surface without consideration of an inclination angle (a polar angle, the pre-tilt angle) from a normal direction of the substrate surface. The liquid crystal molecules 41 are aligned substantially vertically (aligned slightly obliquely) at the time of applying no voltage, and are largely obliquely aligned at the time of applying the voltage while the oblique azimuth at the time of applying no voltage is maintained, so that the start point 41S and the end point 41T of the alignment vector may be checked while the voltage is applied to the liquid crystal layer 40.

Preferably the first alignment film 71 and the second alignment film 72 are each a photo alignment film in which a photo alignment film material is deposited to exert a function of aligning the liquid crystal molecules 41 in a specific direction by performing a photo alignment treatment. The photo alignment film material means a general material that generates a structural change when irradiated with light (electromagnetic wave) such as ultraviolet light and visible light, thereby exerting an ability of controlling the alignment of the nearby liquid crystal molecules 41 (alignment controlling force) or changing the alignment controlling force level and/or direction. For example, the photo alignment film material includes a photoreactive site in which a reaction such as dimerization (dimer formation), isomerization, photo Fries rearrangement, and decomposition is generated by light irradiation. Examples of the photoreactive sites (functional groups) that dimerize and isomerize by the light irradiation include cinnamate, cinnamoyl, 4-chalcone, coumarin, and stilbene. Azobenzene can be cited as an example of the photoreactive site (functional group) that isomerizes by the light irradiation. A phenol ester structure can be cited as an example of the photoreactive site that undergoes the photo Fries rearrangement by the light irradiation. Dianhydride containing a cyclobutane ring such as 1,2,3,4-cyclobutanetetracarboxylic acid-1,2: 3, 4-dianhydride (CBDA) can be cited as an example of the photoreactive site that is decomposed by the light irradiation. Preferably the photo alignment film material exhibits a vertical alignability that can be used in a vertical alignment mode. Examples of the photo alignment film materials include polyamide (polyamic acid), polyimide, polysiloxane derivative, methyl methacrylate, and polyvinyl alcohol that contain the photoreactive site.

Figure 2:
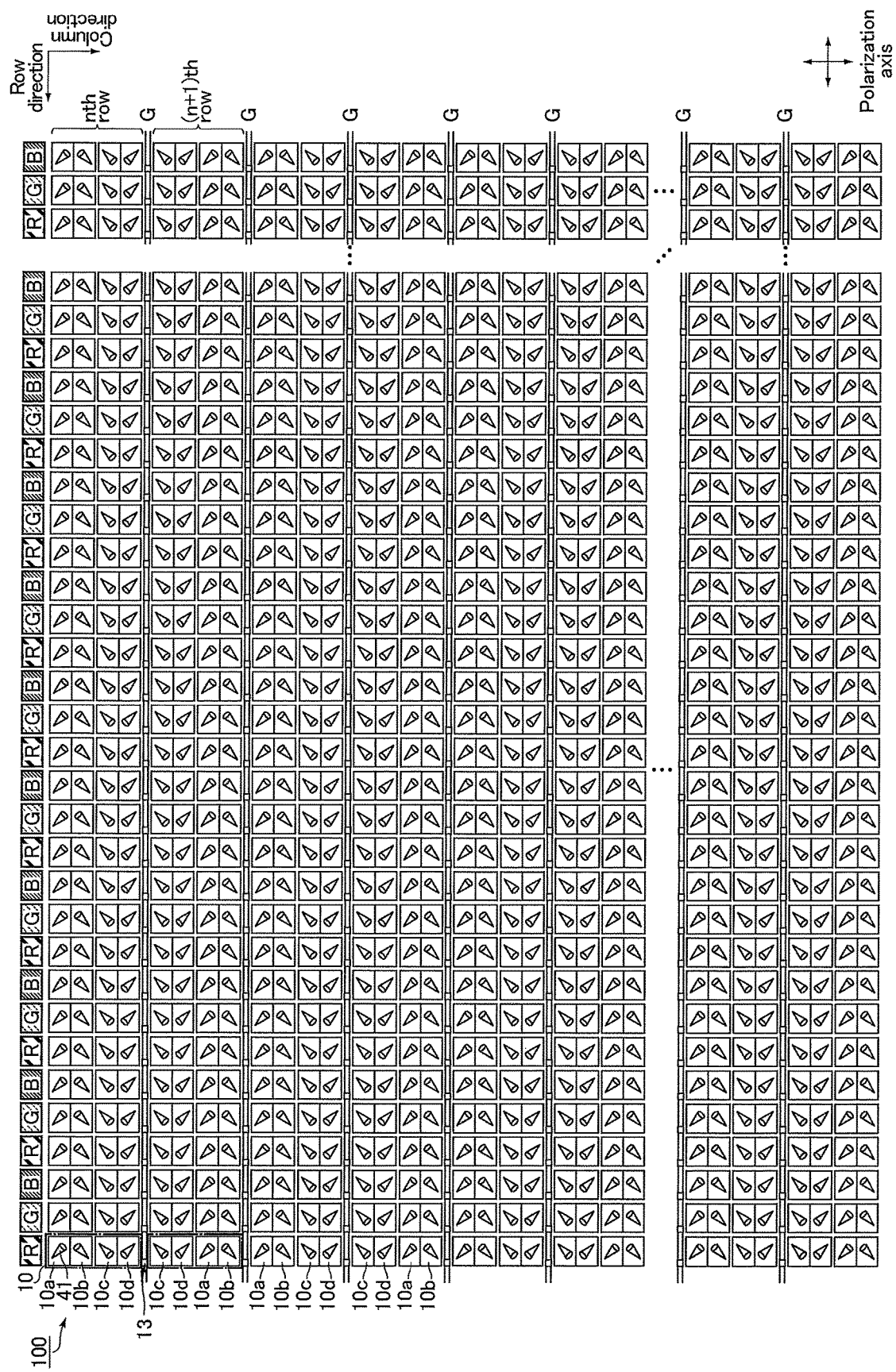
FIG. 2 is a schematic plan view illustrating an arrangement relation of an oblique azimuth of liquid crystal molecules in a liquid crystal layer of the embodiment and a color filter of a second substrate.

FIG. 2 is a schematic plan view illustrating an arrangement relation of the oblique azimuth of the liquid crystal molecules 41 in the liquid crystal layer 40 of the embodiment and a color filter of the second substrate 50. As illustrated in FIG. 2, in the liquid crystal panel 100 of the embodiment, multiple pixels 10 are arranged into a matrix form of N rows and M columns (N and M are integers of 1 or more). As used herein, the pixel 10 means a display unit region superimposed on a single pixel electrode 35, and an R pixel superimposed on a color filter of R (red), a G pixel superimposed on a color filter of G (green), and a B pixel superimposed on the color filter of B (blue) are provided in the pixel 10. In FIG. 2, a portion surrounded by a one dot chain line is one pixel. Stripe-shaped color filters extending in the column direction are arranged on the second substrate 50 in order of R, G, B in the row direction. That is, the arrangement order of the pixels 10 in the row direction is repetition of the R pixel, the G pixel, and the B pixel, and the pixels 10 having the identical color are consecutively arranged in the column direction.

Four domains having different alignment vectors are provided in each pixel 10. These domains can be formed by varying the alignment treatment performed on the first alignment film 71 and the second alignment film 72. When the voltage is applied to the liquid crystal layer 40, the liquid crystal molecules 41 are obliquely aligned so as to be matched with the alignment vector of each domain.

Figure 3:
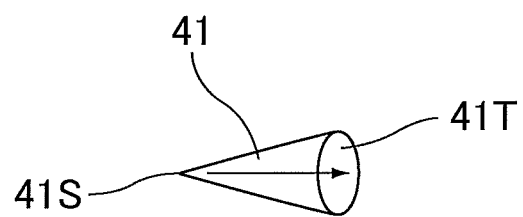
FIG. 3 is a view illustrating a relationship between the oblique azimuth of the liquid crystal molecules and an alignment vector.

In FIG. 2, in order to easily understand the oblique azimuth of the liquid crystal molecules 41, the liquid crystal molecules 41 are represented by pins (cones), the bottom surface of the cone represents the side of the second substrate 50 (observer side), and a vertex of the cone represents the side of the first substrate 30. FIG. 3 is a view illustrating a relationship between the oblique azimuth of the liquid crystal molecules 41 and the alignment vector.

The domains in the pixel located in the nth row (n is any integer greater than or equal to 1) are arranged in the order of a first domain 10a in which the direction of the alignment vector is a first direction, a second domain 10b in which the direction of the alignment vector is a second direction, a third domain 10c in which the direction of the alignment vector is a third direction, and a fourth domain 10d in which the direction of the alignment vector is a fourth direction. The group of identical-color pixels consecutive in the column direction may include the pixels 10 in which the arrangement order of the four domains varies. Specifically, the domains in the pixel (the (n+1)th row pixel) located in the (n+1)th row adjacent to the nth row preferably satisfy the relationship in which the first domain 10a and the fourth domain 10d are located between the second domain 10b and the third domain 10c. As illustrated in FIG. 2, more preferably the domains in the (n+1)th row pixel are arranged in the order of the third domain 10c, the fourth domain 10d, the first domain 10a, and the second domain 10b. Two kinds of pixels having different arrangement order of the four domains may be alternately and repeatedly arranged in the group of identical-color pixels consecutive in the column direction. In other words, pixels having different domain arrangement order may be arranged in two row periods. In this case, as illustrated in FIG. 2, the domains in the pixel located in the (n+2)th row are arranged in the order of the first domain 10a, the second domain 10b, the third domain 10c, and the fourth domain 10d. At least one gate line G extends between the nth row pixel and the (n+1)th row pixel.

From the viewpoint of obtaining a good viewing angle characteristic, the alignment vectors of the first domain 10a, the second domain 10b, the third domain 10c, and the fourth domain 10d are a combination of four alignment vectors that, face in directions different from one another by 90°. The alignment vector of each domain can be decided by the direction of the liquid crystal molecules 41 located in the center of the domain in a plan view and located in the center of the liquid crystal layer in a cross-sectional view.

From the viewpoint of suppressing a dark line generated between the domains, in a plan view of the nth row pixel, the alignment vectors of the first domain 10a, the second domain 10b, the third domain 10c, and the fourth domain 10d preferably have the following relationships (1) to (3).

(1) The alignment vectors of the first domain 10a and the second domain 10b have a relationship, in which the end points are opposed to each other and the alignment vectors are orthogonal to each other (forming an angle of about 90°) (hereinafter referred to as "a domain boundary condition A").

(2) The alignment vectors of the second domain 10b and the third domain 10c have a relationship, in which the start points are opposed to each other and the alignment vectors are parallel to each other (forming an angle of about 180°) (hereinafter referred to as "a domain boundary condition B").

(3) The alignment vectors of the third domain 10c and the fourth domain 10d have the relationship (domain boundary condition A), in which the end points are opposed to each other and the alignment vectors are orthogonal to each other (forming the angle of about 90°).

As used herein, in the term "orthogonal (forming the angle of about 90°)", the alignment vectors may be substantially orthogonal to each other within a range where the effect of the present invention is obtained, specifically the term "orthogonal" means that the alignment vectors form an angle of 75° to 105°, preferably an angle of 80° to 100°, more preferably an angle of 85° to 95°. In the term "parallel (forming an angle of about 180°)", the alignment vectors may be substantially parallel to each other within the range where the effect of the present invention is obtained, specifically the term "parallel" means that the alignment vectors form an angle of −15° to +15°, preferably an angle of −10° to +10°, more preferably an angle of −5° to +5°.

The dark line is formed due to discontinuity of the alignment of the liquid crystal molecules 41 at a boundary between the domains having different alignment azimuths of the liquid crystal molecules 41. In the region where the alignment of the liquid crystal molecules 41 is discontinuous, because the liquid crystal molecules 41 cannot be aligned in an intended direction, the light can insufficiently be transmitted during display, and the region is recognized as a dark portion. The dark portion formed in a linear shape is called the dark line. When the dark line is generated, transmittance (contrast ratio) of the pixel 10 decreases, so that light use efficiency of the liquid crystal panel 100 is degraded. In recent years, high definition of the pixel 10 has advanced and an area per pixel is reduced, but an area of the dark line does not change even if the pixel 10 is reduced, so that an area ratio occupied by the dark line in the pixel 10 increases, and therefore prevention of the degradation of the light use efficiency becomes more important. When the dark line is generated at a different position in each pixel 10, uniformity of the display is also degraded. On the other hand, the inventors have studied that a generation situation of the dark line changes according to the arrangement of the domains, and have found that the arrangement of the domain boundary conditions A-B-A satisfying all of the relationships (1) to (3) effectively suppresses the dark line.

In the first domain 10a, the second domain 10b, the third domain 10c, and the fourth domain 10d, an inter-substrate twist angle of the liquid crystal molecules 41 is preferably less than or equal to 45°, more preferably about 0°. That is, in the first domain 10a, the second domain 10b, the third domain 10c, and the fourth domain 10d, an angle formed between the oblique azimuth of the liquid crystal molecules 41 with respect to the first alignment film 71 on the side of the first substrate 30 and the oblique azimuth of the liquid crystal molecules 41 with respect to the second alignment film 72 on the side of the second substrate 50 is preferably less than or equal to 45°, more preferably about 0°.

The planar shapes of the first domain 10a, the second domain 10b, the third domain 10c, and the fourth domain 10d are not particularly limited. For example, the first domain 10a, the second domain 10b, the third domain 10c, and the fourth domain 10d are formed into a substantially rectangular shape. The rectangular shape may be either a square or an oblong.

In the liquid crystal panel 100 of the embodiment, as illustrated in FIG. 2, the arrangement order (domain array) of the first domain 10a, the second domain 10b, the third domain 10c, and the fourth domain 10d is identical in at least 30 pixels consecutive in the row direction. The identical-domain-array pixels arranged consecutively in the row direction preferably have at least a ratio of one half to the total number of pixels in the row direction of the display region, more preferably at least a ratio of 90% to the total number of pixels in the row direction of the display region. Further preferably the pixels arranged in the row direction in the entire display region have the same domain array. The pixels arranged in the row direction can have the same domain array by performing the alignment treatment on the first alignment film 71 and the second alignment film 72 using scanning exposure. For example, the scanning exposure may be performed using a photo alignment treatment device in FIG. 10.

The domain arrays of pixels arranged consecutively in the row direction are made identical, which allows the suppression of the generation of defects due to misalignment in a lateral direction (row direction) of the liquid crystal panel 100. Specifically, the generation of a display defect such as display unevenness due to bending of the liquid crystal panel 100 can be suppressed, and the effect that suppresses the generation of the display defect appears notably in a higher-added-value, large-sized, and high-definition liquid crystal panel. Consequently, the liquid crystal panel 100 of the embodiment can suitably be used for a higher-added-value, large-sized, and high-definition liquid crystal display in which excellent display quality is required. The liquid crystal panel 100 of the embodiment can also be used for a high-designability, large-sized, high-definition curved (non-planar) display. A method of thickening a light shielding body is adopted as another method of improving the display unevenness, but the transmittance decreases in this method. In particular, because the high-definition liquid crystal panel has the low transmittance, the further decrease in transmittance causes a serious problem such as a loss of marketability.

The liquid crystal panel 100 tends to become larger, lighter (thinning of the glass substrate), and higher definition. The liquid crystal panel 100 that becomes larger and lighter is easily bent, and particularly easily bent in a long-side direction (row direction). When the liquid crystal panel 100 is bent, the fitting between the first substrate 30 and the second substrate 50 is partially and irregularly misaligned. For a conventional liquid crystal panel having a multi-domain structure, when the misalignment is generated, a width and a shape of the dark line at the domain boundary change, and the transmittance changes, so that the display unevenness is generated. The display unevenness is a belt-shaped unevenness extending from an upper end to a lower end of the liquid crystal panel, and is sometimes generated at an irregular position, which sometimes significantly degrades the display quality of the entire liquid crystal panel. The display unevenness tends to be easily generated in a relatively-expensive, large-sized, and high-definition liquid crystal panel. On the other hand, the liquid crystal panel 100 of the embodiment has the multi-domain structure, but does not generate the changes of the width and shape of the dark line due to the misalignment in the lateral direction (row direction). Because the liquid crystal panel 100 of the embodiment has the identical domain array in the lateral direction (row direction) so that the domain boundary and the dark line do not exist in the lateral direction, this leads to an essential measure against the display unevenness in the liquid crystal panel 100 of the embodiment.

The generation situation of the display unevenness in the case that the liquid crystal panel 100 is bent will be described with reference to the drawings.

Figure 14A:
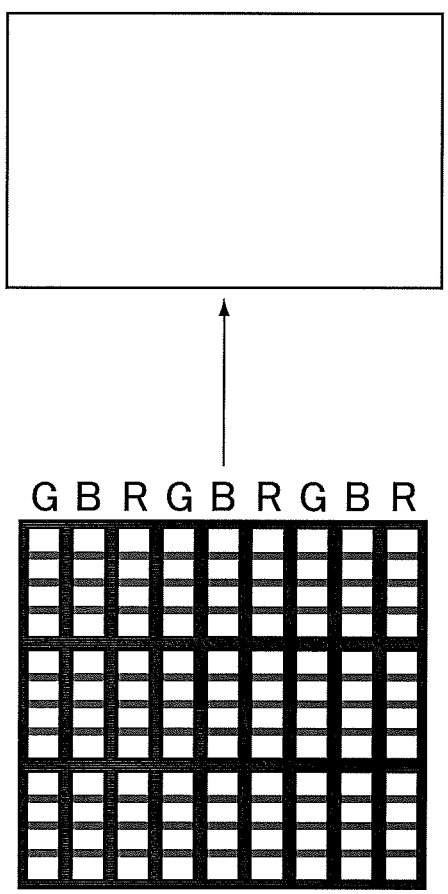
FIGS. 14A and 14B are views each illustrating the case that the liquid crystal panel of the embodiment is bent.
Figure 14B:
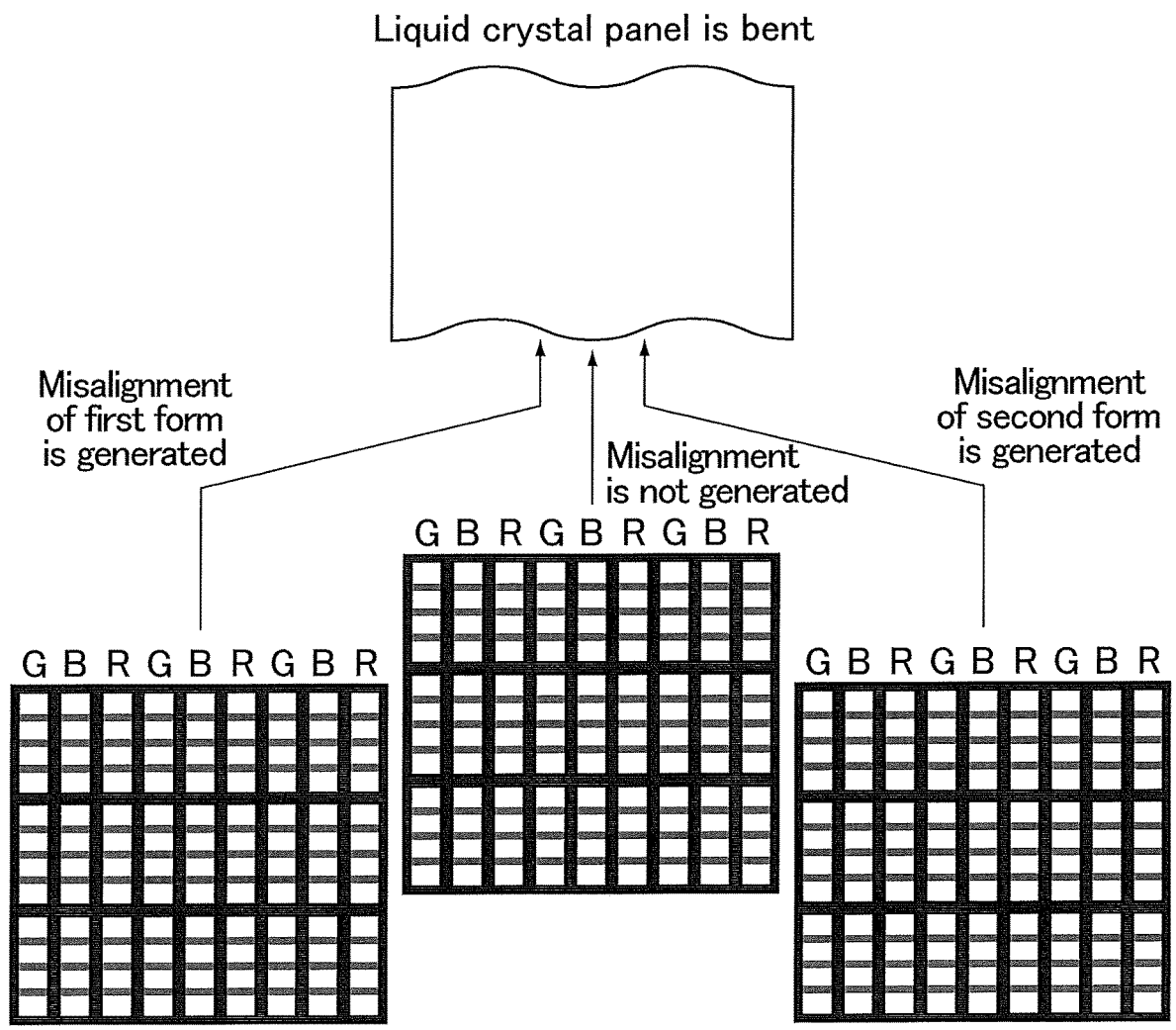
Figure 15A:
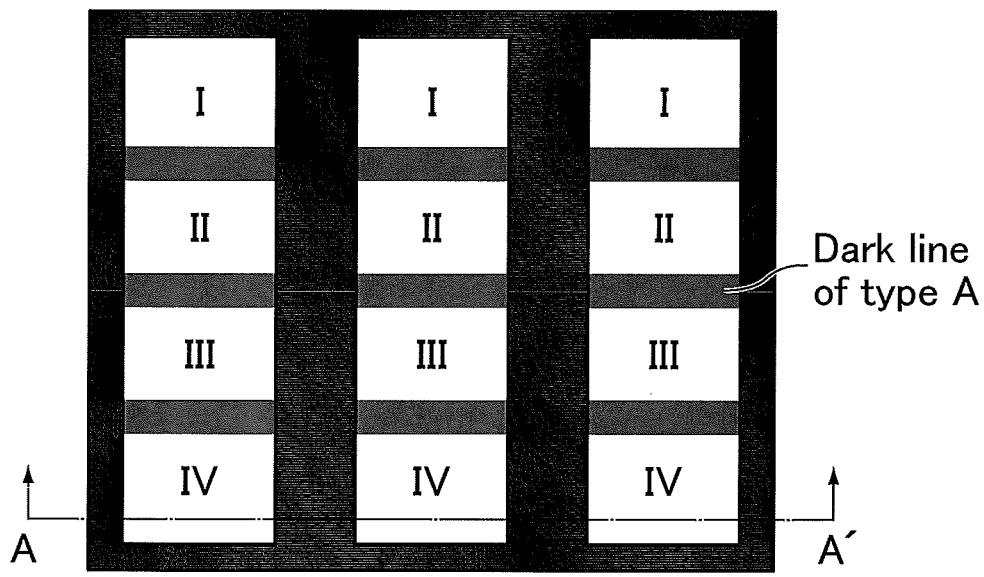
FIGS. 15A and 15B are views each illustrating the state of a dark line in a portion in which misalignment is not generated in the liquid crystal panel of the embodiment.
Figure 15B:
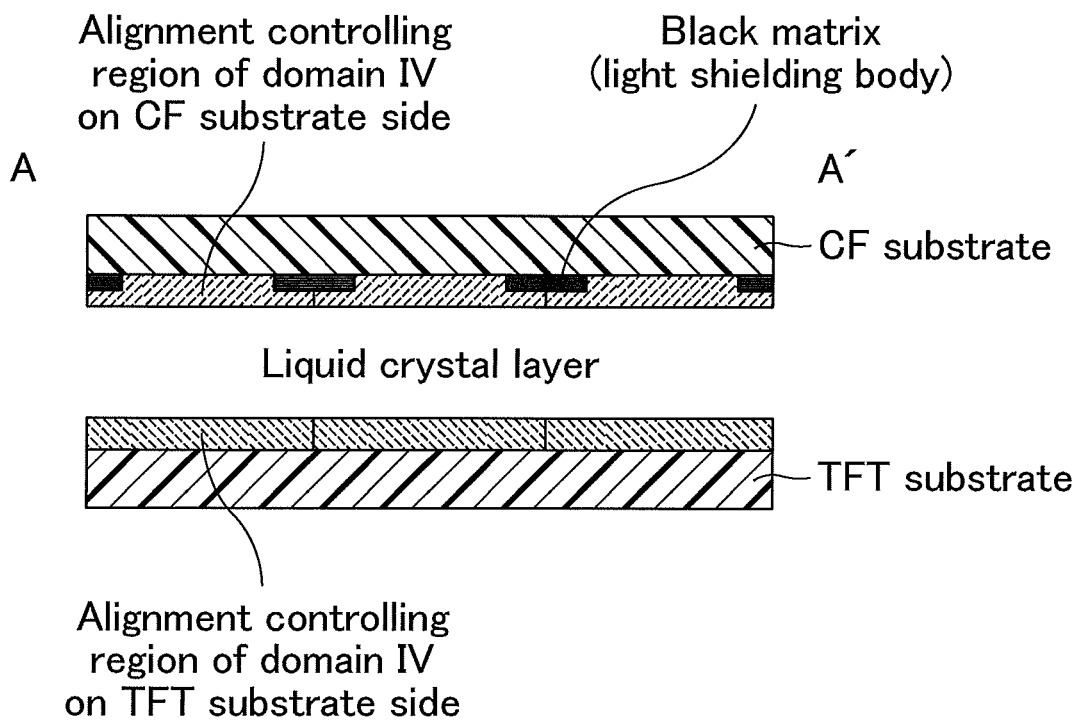
Figure 16A:
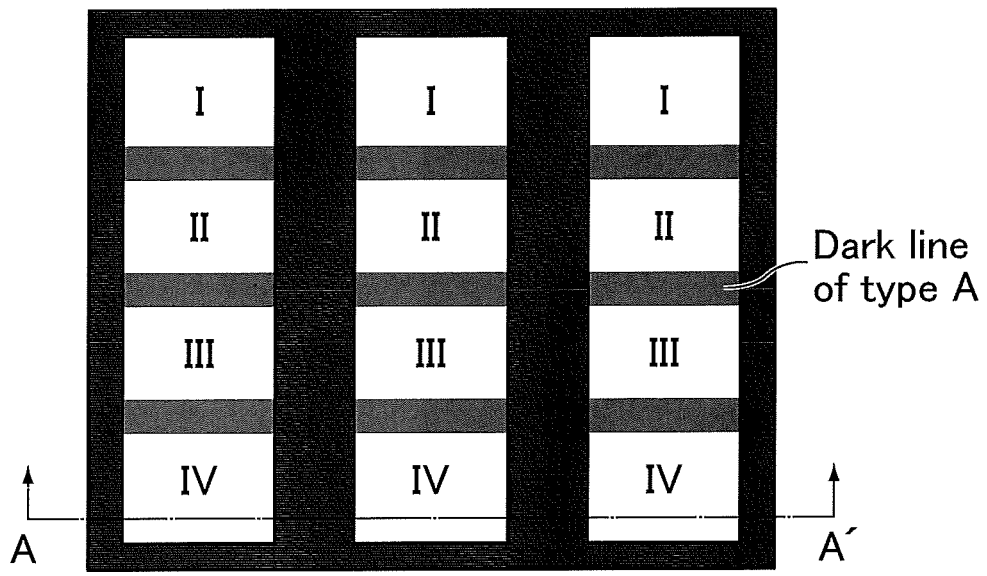
FIGS. 16A and 16B are views each illustrating the state of the dark line in a portion in which the misalignment of a first form is generated in the liquid crystal panel of the embodiment.
Figure 16B:
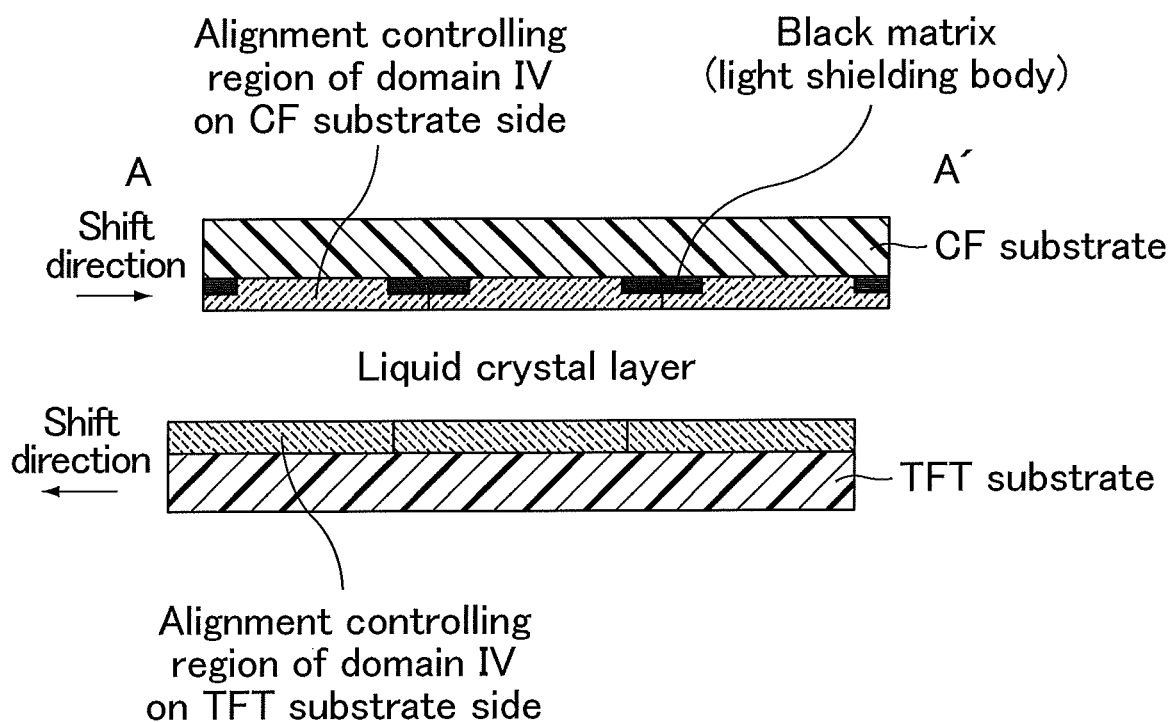
Figure 17A:
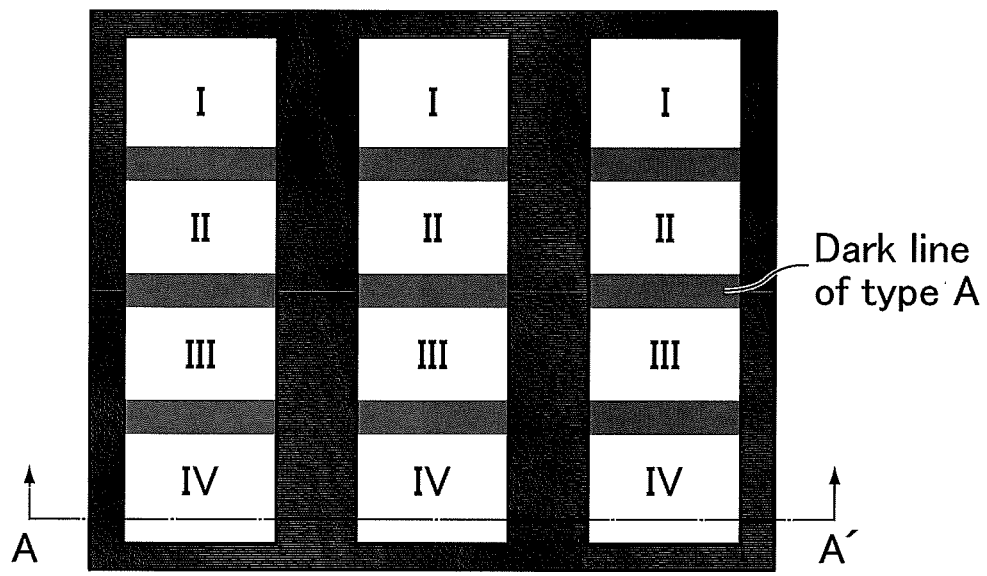
FIGS. 17A and 17B are views each illustrating the state of the dark line in a portion in which the misalignment of a second form is generated in the liquid crystal panel of the embodiment.
Figure 17B:
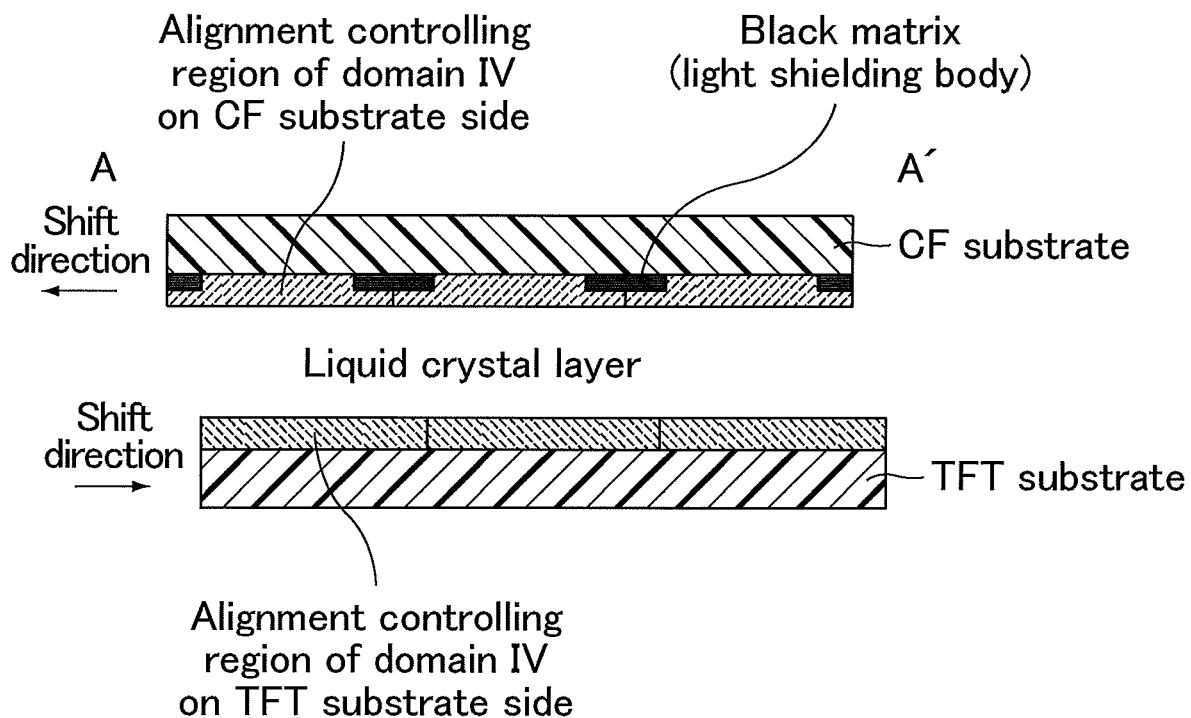

FIGS. 14A and 14B are views each illustrating the case that the liquid crystal panel 100 of the embodiment is bent, FIG. 14A illustrates the state in which the liquid crystal panel 100 is not bent, and FIG. 14B illustrates the state in which the liquid crystal panel 100 is bent. As illustrated in FIG. 14B, the display defect is not generated in any one of a portion in which the misalignment of a first form is generated, a portion in which the misalignment is not generated, and a portion in which the misalignment of a second form is generated. FIGS. 15A and 15B are views each illustrating the state of a dark line in a portion in which misalignment is not generated in the liquid crystal panel 100 of the embodiment, FIG. 15A is a plan view of the pixel, and FIG. 15B is a cross-sectional view taken along line A-A'. As illustrated in FIGS. 15A and 15B, the dark line of a type A generated in a region where the alignment changes continuously due to an influence of the adjacent domain having different alignment is generated in a domain boundary region. FIGS. 16A and 16B are views each illustrating the state of the dark line in a portion in which the misalignment of the first form is generated in the liquid crystal panel 100 of the embodiment, FIG. 16A is a plan view of the pixel, and FIG. 16B is a cross-sectional view taken along line A-A'. As illustrated in FIGS. 16A and 16B, in the state in which the liquid crystal panel 100 is bent, for example, the TFT substrate is shifted onto the left side and the CF substrate is shifted onto the right side, and the misalignment is generated. However, the misalignment in the lateral direction does not influence the liquid crystal alignment, and the dark line of the type A is generated only in the domain boundary region. FIGS. 17A and 17B are views each illustrating the state of the dark line in a portion in which the misalignment of the second form is generated in the liquid crystal panel 100 of the embodiment, FIG. 17A is a plan view of the pixel, and FIG. 17B is a cross-sectional view taken along line A-A'. As illustrated in FIGS. 17A and 17B, the misalignment in the lateral direction does not influence the liquid crystal alignment, and the dark line of the type A is generated only in the domain boundary region.

Figure 18A:
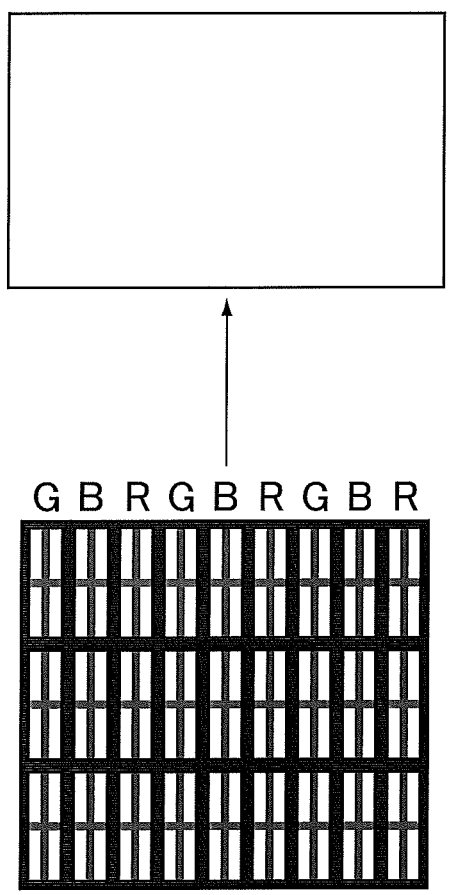
FIGS. 18A and 18B are views each illustrating the case that a first conventional liquid crystal panel is bent.
Figure 18B:
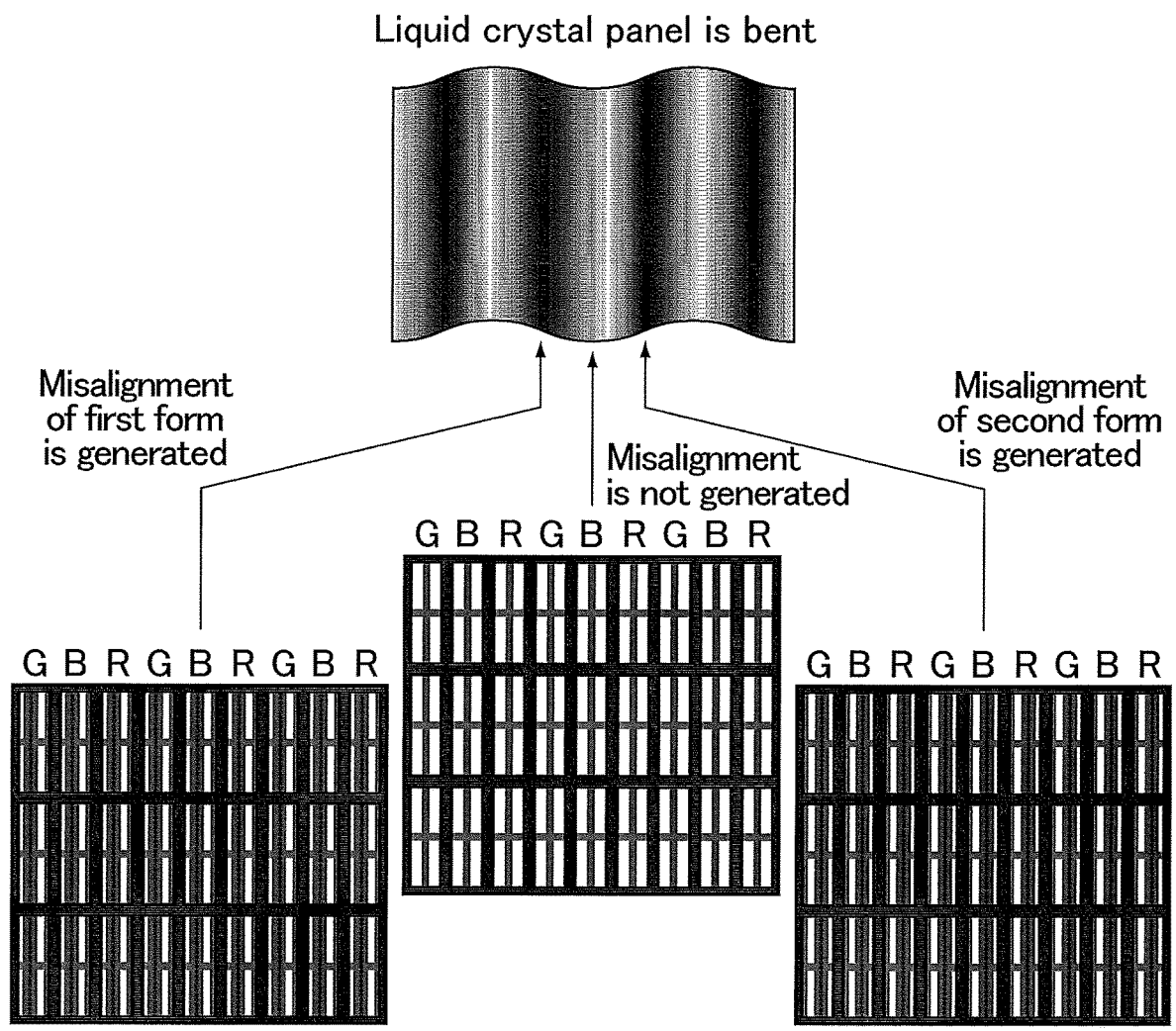
Figure 19A:
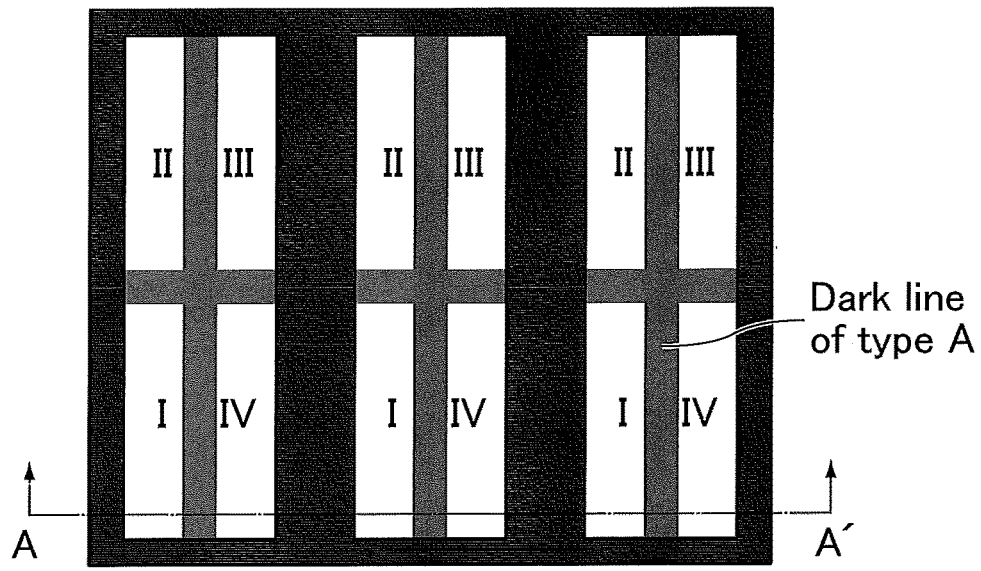
FIGS. 19A and 19B are views each illustrating the state of the dark line in a portion in which the misalignment is not generated in the first conventional liquid crystal panel.
Figure 19B:
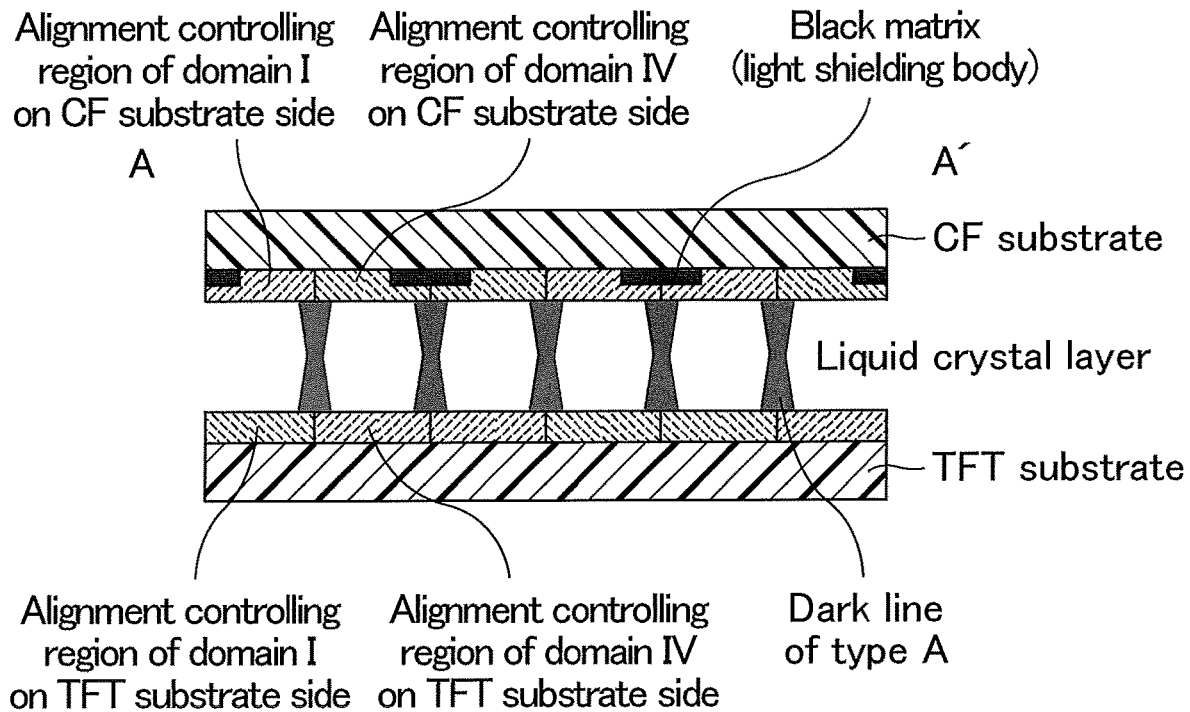
Figure 20A:
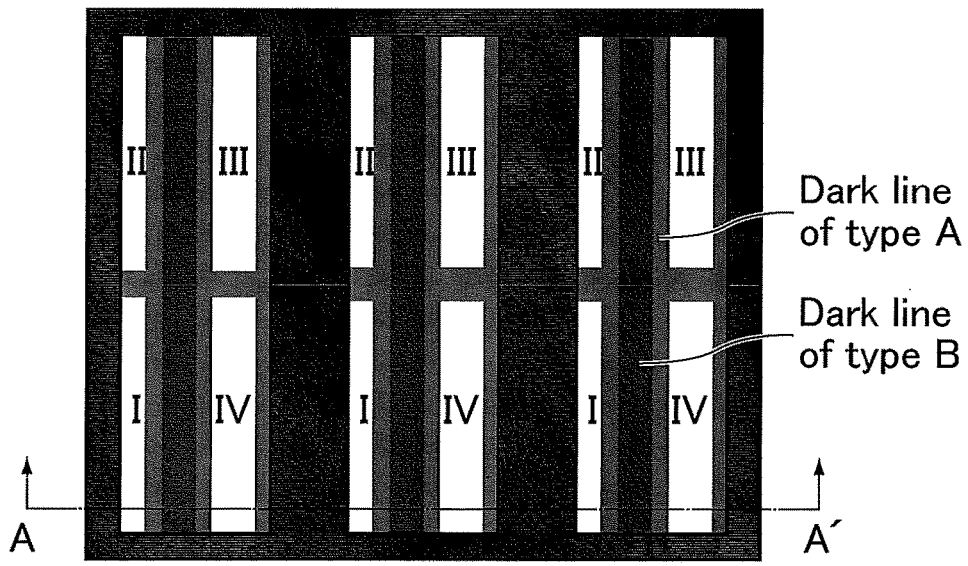
FIGS. 20A and 20B are views each illustrating the state of the dark line in a portion in which the misalignment of the first form is generated in the first conventional liquid crystal panel.
Figure 20B:
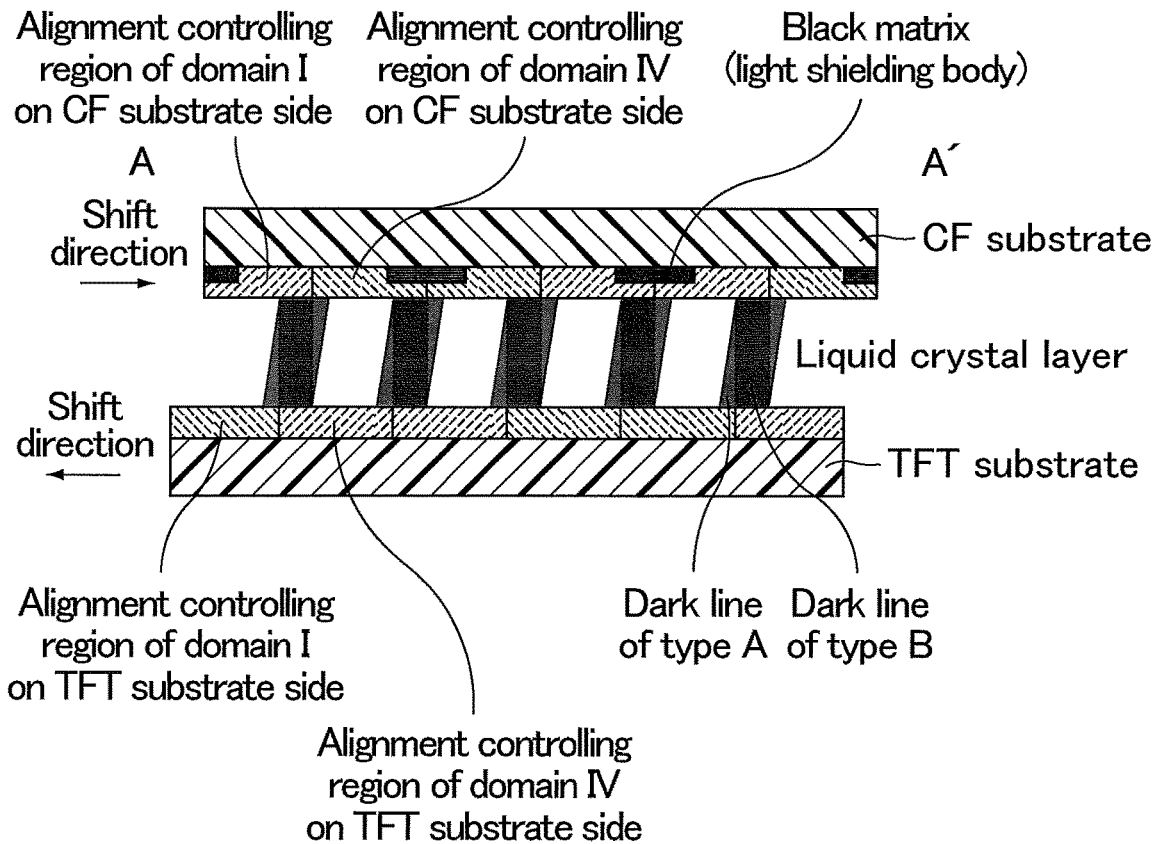
Figure 21A:
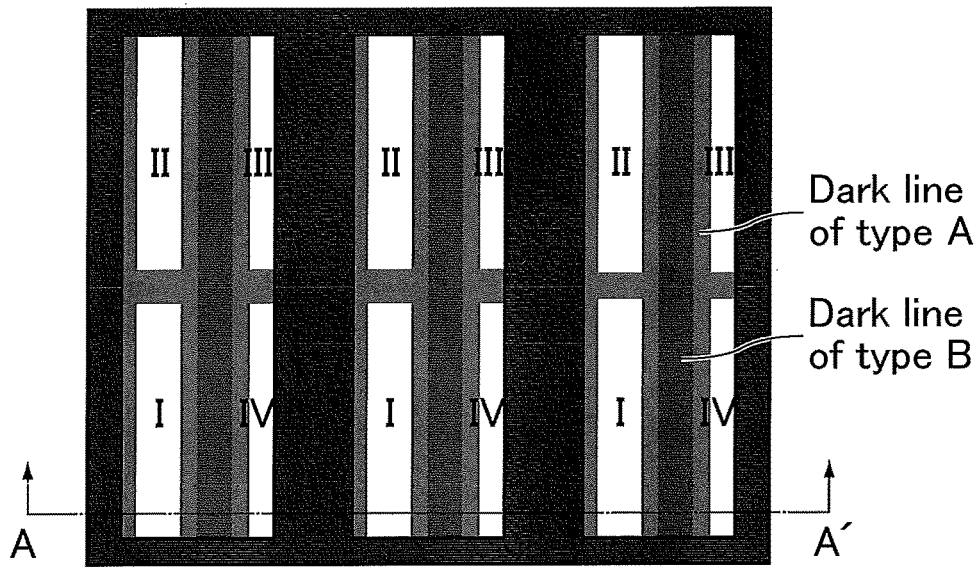
FIGS. 21A and 21B are views each illustrating the state of the dark line in a portion in which the misalignment of the second form is generated in the first conventional liquid crystal panel.
Figure 21B:
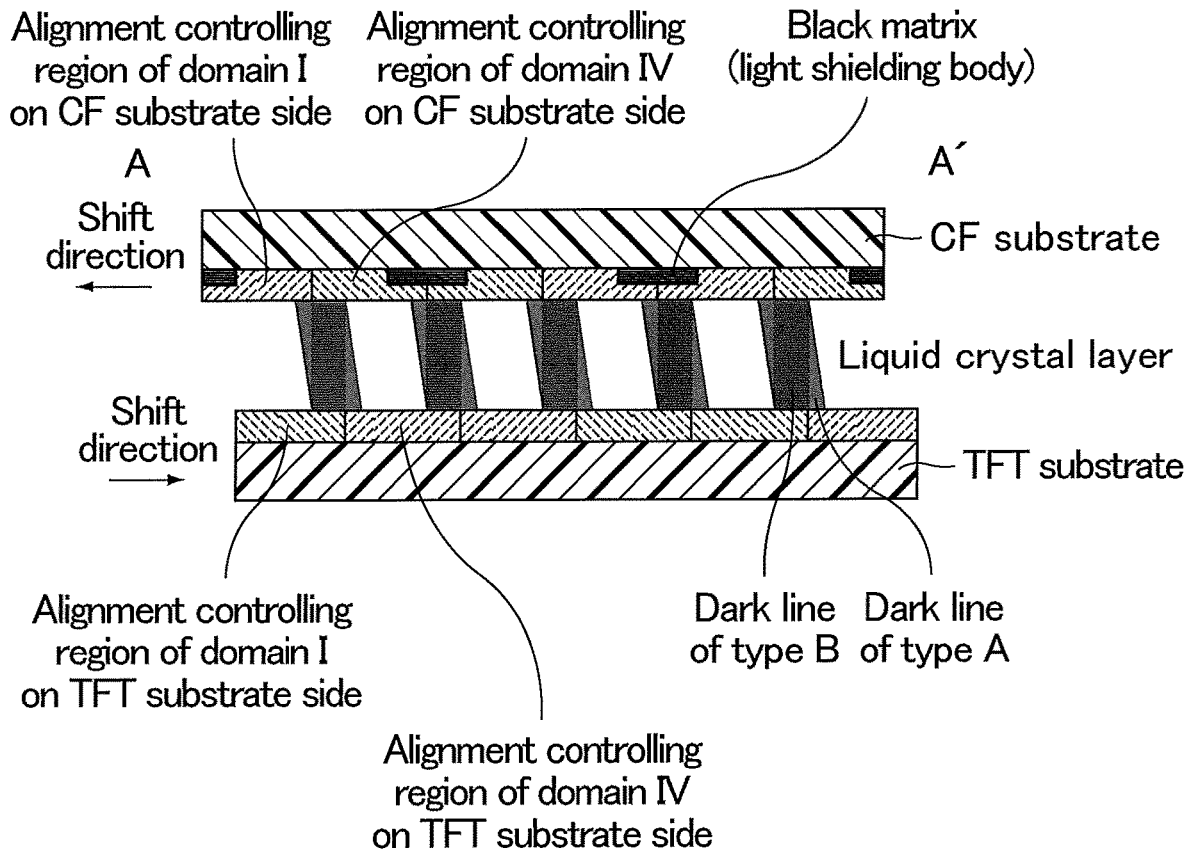

FIGS. 18A and 18B are views each illustrating the case that a first conventional liquid crystal panel is bent, FIG. 18A illustrates the state in which the first conventional liquid crystal panel is not bent, and FIG. 18B illustrates the state in which the first conventional liquid crystal panel is bent. As illustrated in FIG. 18B, the display defect is generated in the portion in which the misalignment of the first form is generated and the portion in which the misalignment of the second form is generated. FIGS. 19A and 19B are views each illustrating the state of the dark line in a portion in which the misalignment is not generated in the first conventional liquid crystal panel, FIG. 19A is a plan view of the pixel, and FIG. 19B is a cross-sectional view taken along line A-A'. As illustrated in FIGS. 19A and 19B, the dark line of the type A is generated only in the domain boundary region. FIGS. 20A and 20B are views each illustrating the state of the dark line in a portion in which the misalignment of the first form is generated in the first conventional liquid crystal panel, FIG. 20A is a plan view of the pixel, and FIG. 20B is a cross-sectional view taken along line A-A'. As illustrated in FIGS. 20A and 20B, in a portion, in which the first conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of a type B generated in the region where the liquid crystal alignment becomes abnormal is generated by mismatching of the alignment controlling regions on the TFT substrate side and the CF substrate side due to the misalignment of the upper and lower substrates. As a result, luminance is degraded lower than the portion in which the misalignment is not generated. FIGS. 21A and 21B are views each illustrating the state of the dark line in a portion in which the misalignment of the second form is generated in the first conventional liquid crystal panel, FIG. 21A is a plan view of the pixel, and FIG. 21B is a cross-sectional view taken along line A-A'. As illustrated in FIGS. 21A and 21B, in a portion, in which the first conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, luminance is degraded lower than the portion in which the misalignment is not generated.

Figure 22A:
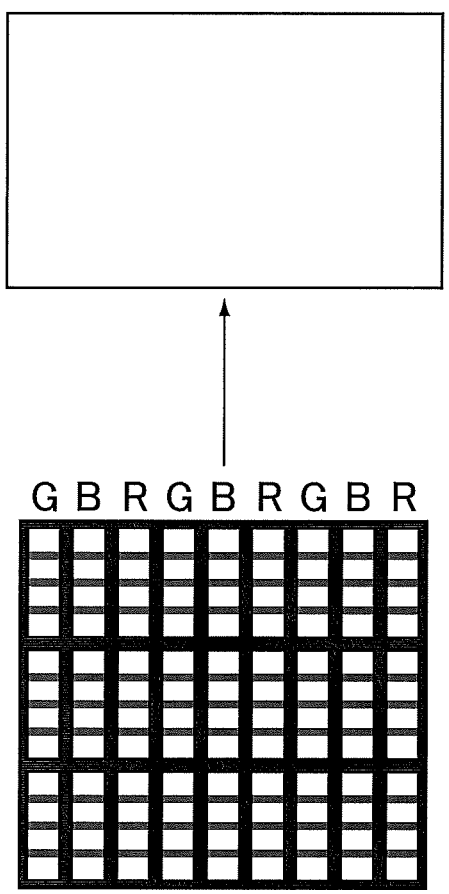
FIGS. 22A and 22B are views each illustrating the case that a second conventional liquid crystal panel is bent.
Figure 22B:
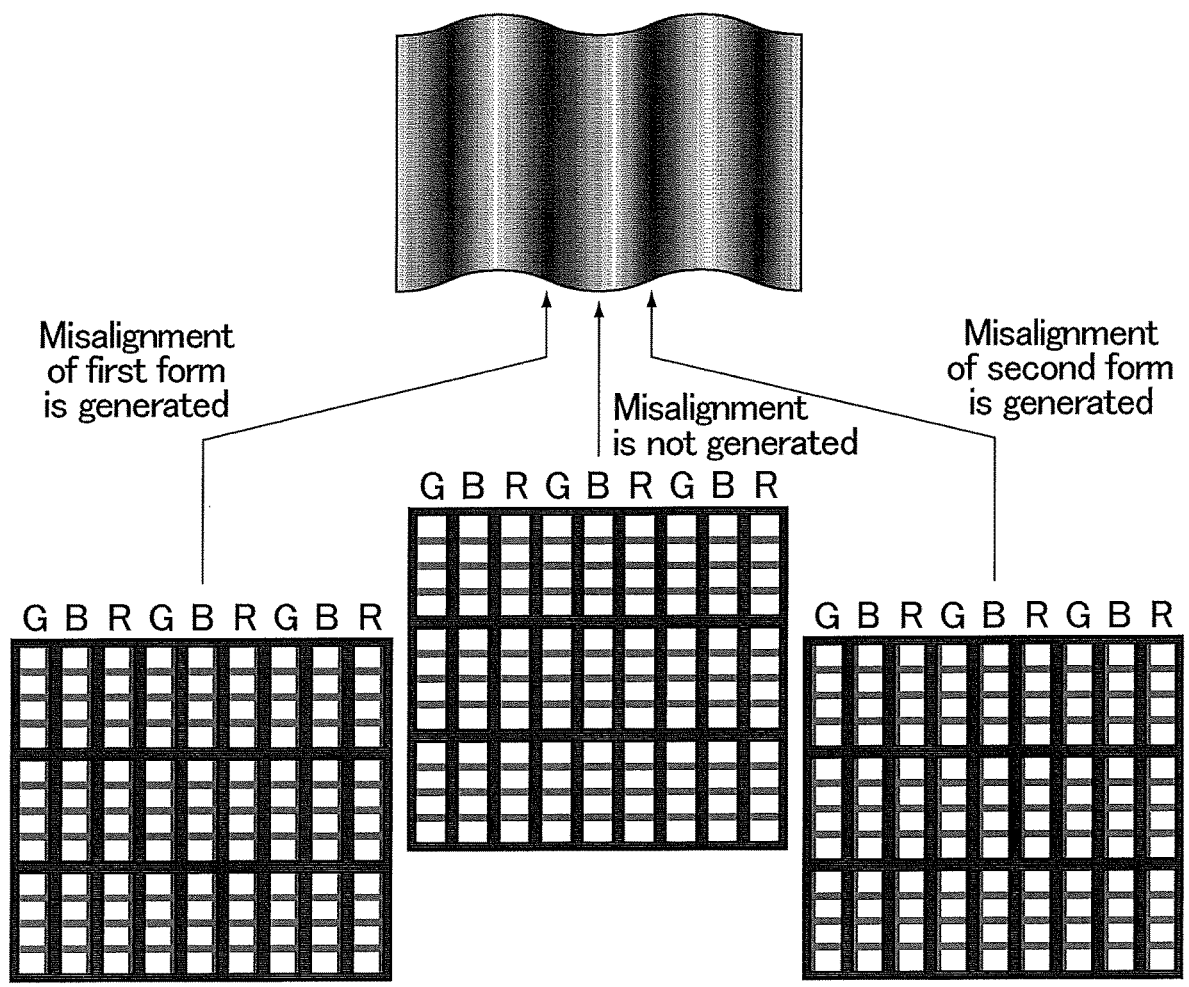
Figure 23A:
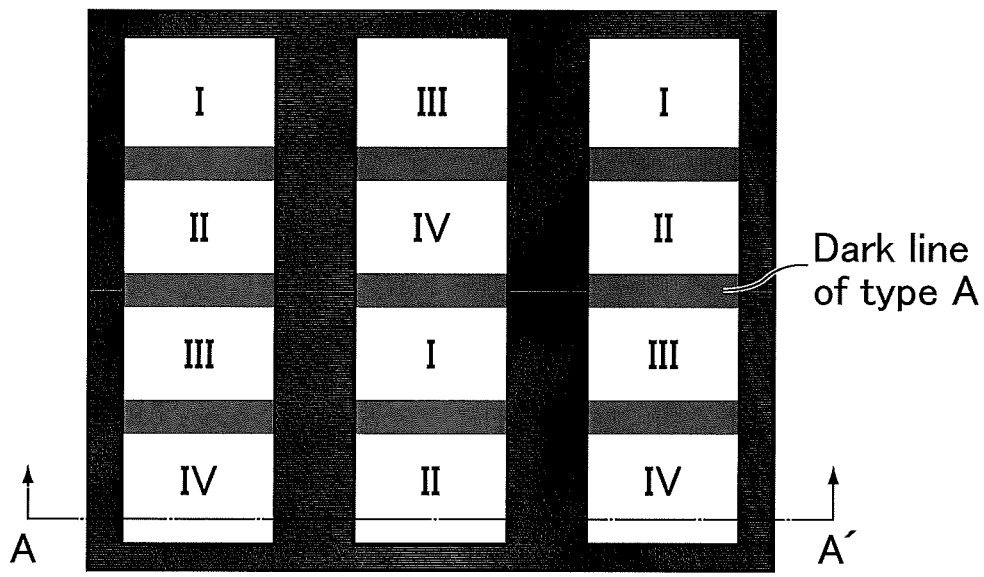
FIGS. 23A and 23B are views each illustrating the state of the dark line in a portion in which the misalignment is not generated in the second conventional liquid crystal panel.
Figure 23B:
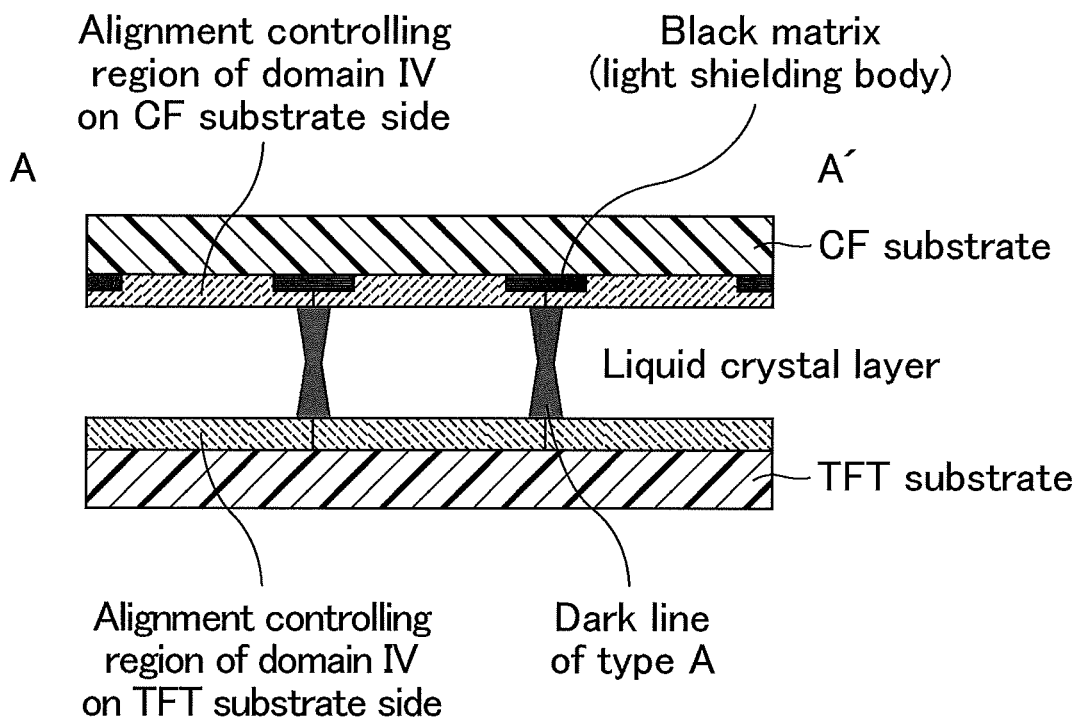
Figure 24A:
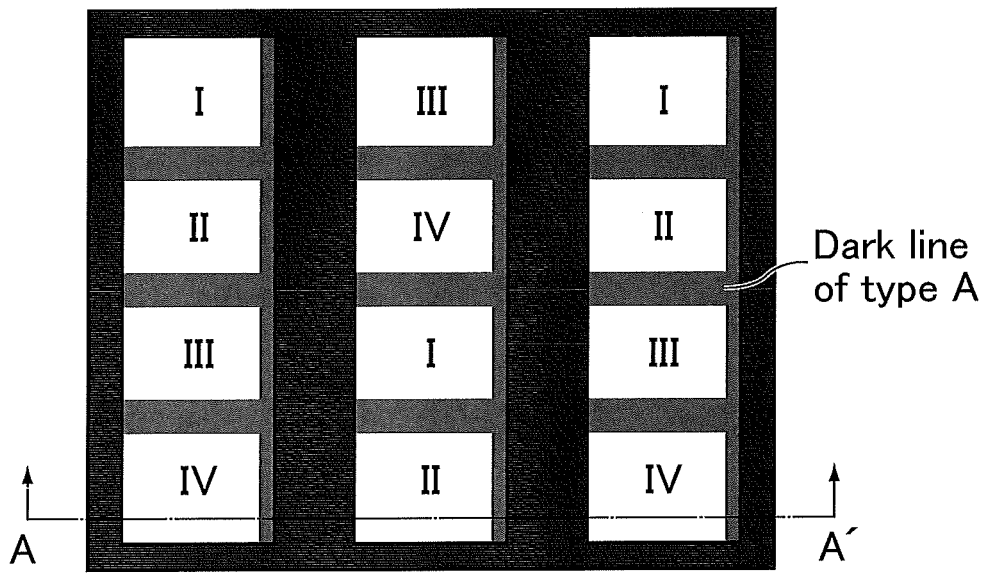
FIGS. 24A and 24B are views each illustrating the state of the dark line in a portion in which the misalignment of the first form is generated in the second conventional liquid crystal panel.
Figure 24B:
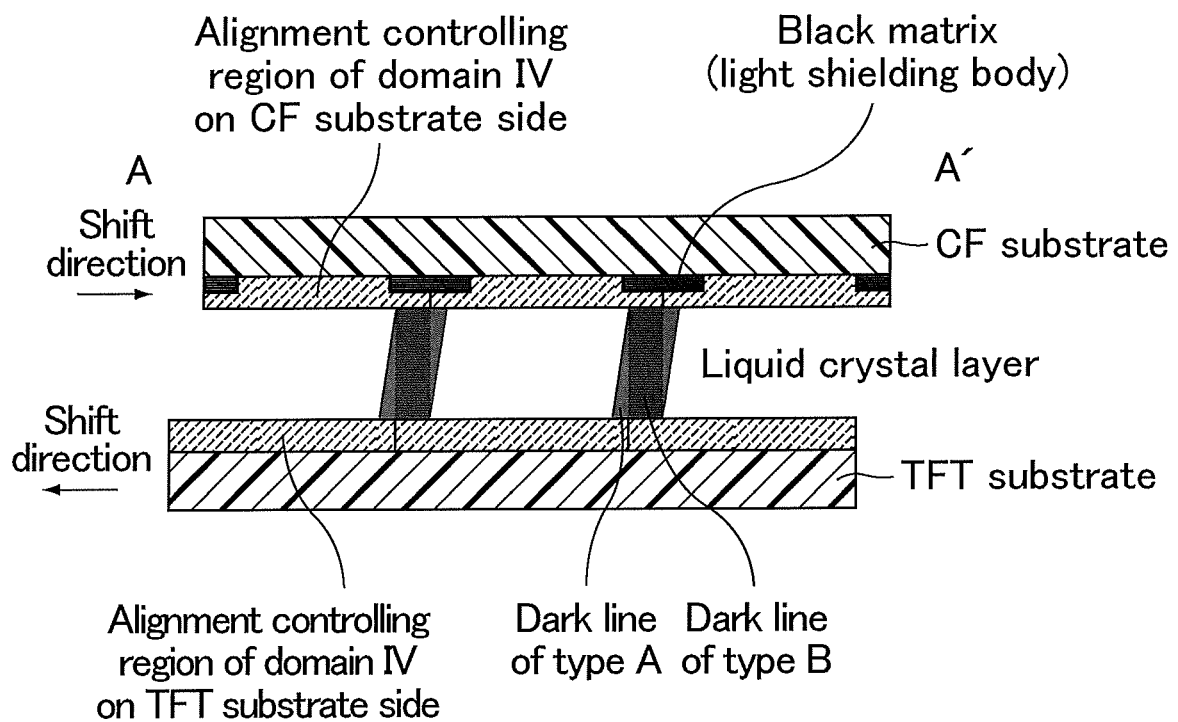
Figure 25A:
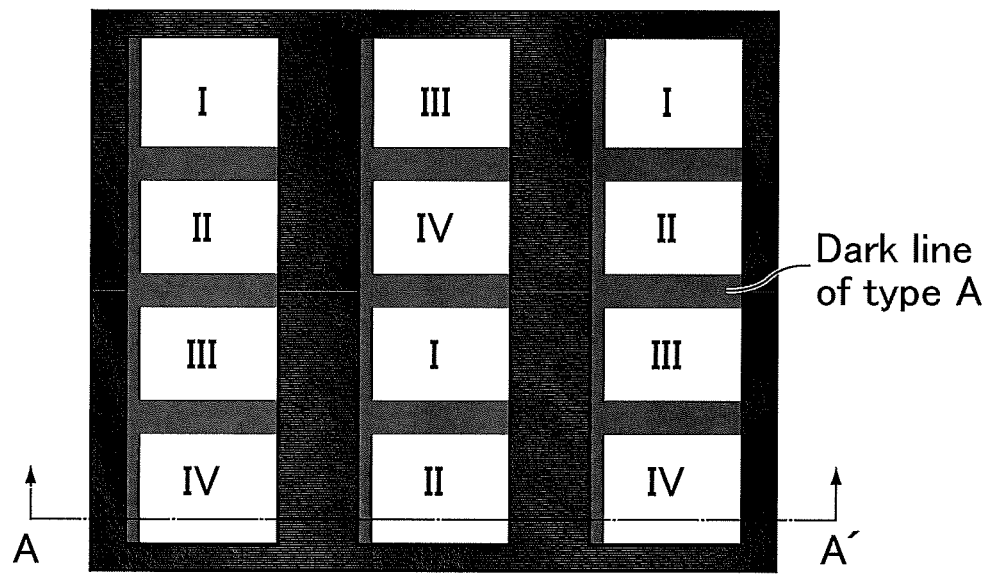
FIGS. 25A and 25B are views each illustrating the state of the dark line in a portion in which the misalignment of the second form is generated in the second conventional liquid crystal panel.
Figure 25B:
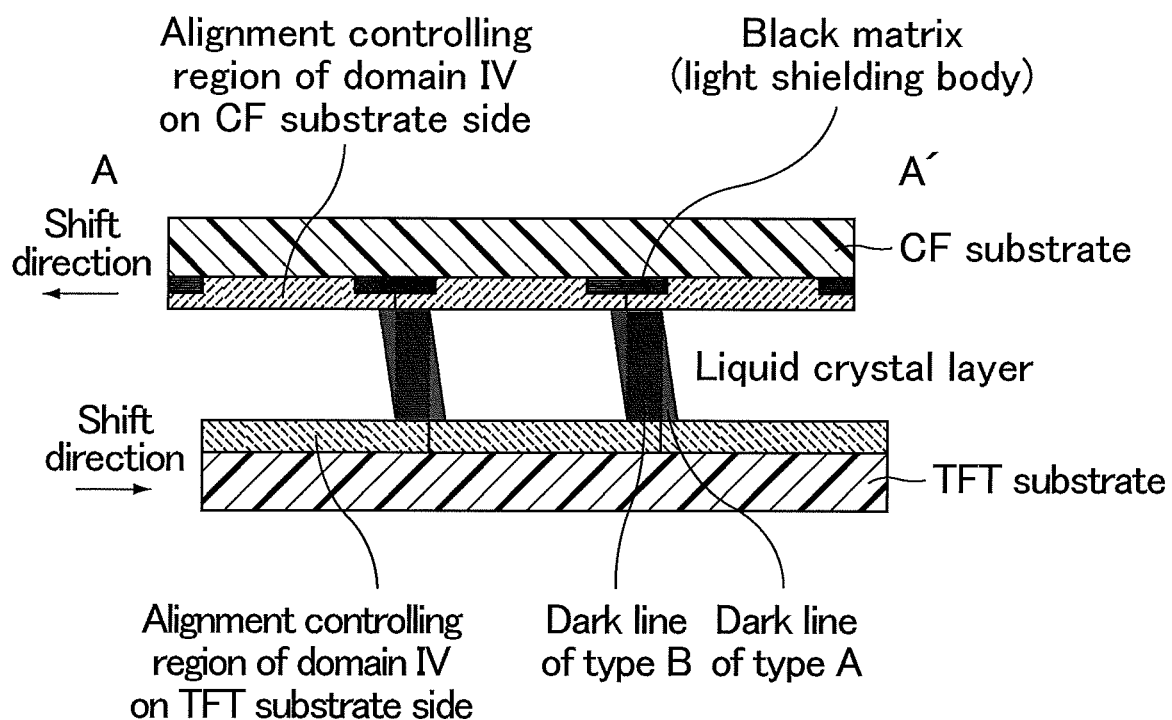

FIGS. 22A and 22B are views each illustrating the case that a second conventional liquid crystal panel is bent, FIG. 22A illustrates the state in which the second conventional liquid crystal panel is not bent, and FIG. 22B illustrates the state in which the second conventional liquid crystal panel is bent. As illustrated in FIG. 22B, the display defect is generated in the portion in which the misalignment of the first form is generated and the portion in which the misalignment of the second form is generated. FIGS. 23A and 23B are views each illustrating the state of the dark line in a portion in which the misalignment is not generated in the second conventional liquid crystal panel, FIG. 23A is a plan view of the pixel, and FIG. 23B is a cross-sectional view taken along line A-A'. As illustrated in FIGS. 23A and 23B, the dark line of the type A is generated only in the domain boundary region. FIGS. 24A and 24B are views each illustrating the state of the dark line in a portion in which the misalignment of the first form is generated in the second conventional liquid crystal panel, FIG. 24A is a plan view of the pixel, and FIG. 24B is a cross-sectional view taken along line A-A'. As illustrated in FIGS. 24A and 24B, in a portion, in which the second conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body, and the luminance is degraded lower than the portion in which the misalignment is not generated. FIGS. 25A and 25B are views each illustrating the state of the dark line in a portion in which the misalignment of the second form is generated in the second conventional liquid crystal panel, FIG. 25A is a plan view of the pixel, and FIG. 25B is a cross-sectional view taken along line A-A'. As illustrated in FIGS. 25A and 25B, in a portion, in which the second conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body, and the luminance is degraded lower than the portion in which the misalignment is not generated.

Figure 26A:
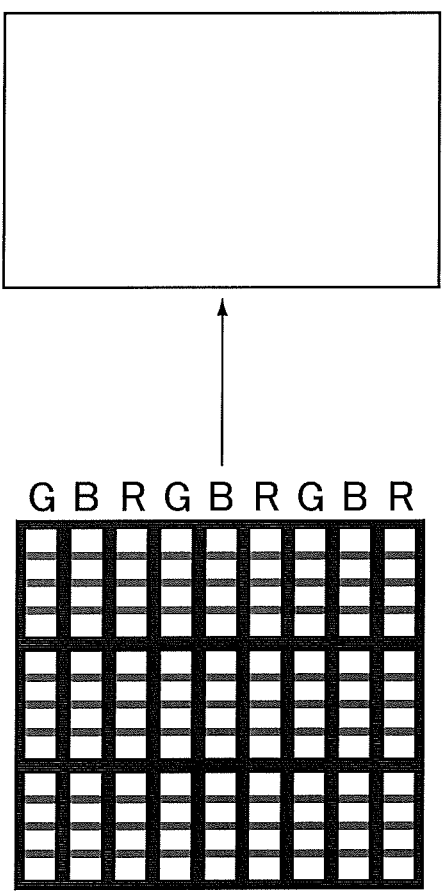
FIGS. 26A and 26B are views each illustrating the case that a third conventional liquid crystal panel is bent.
Figure 26B:
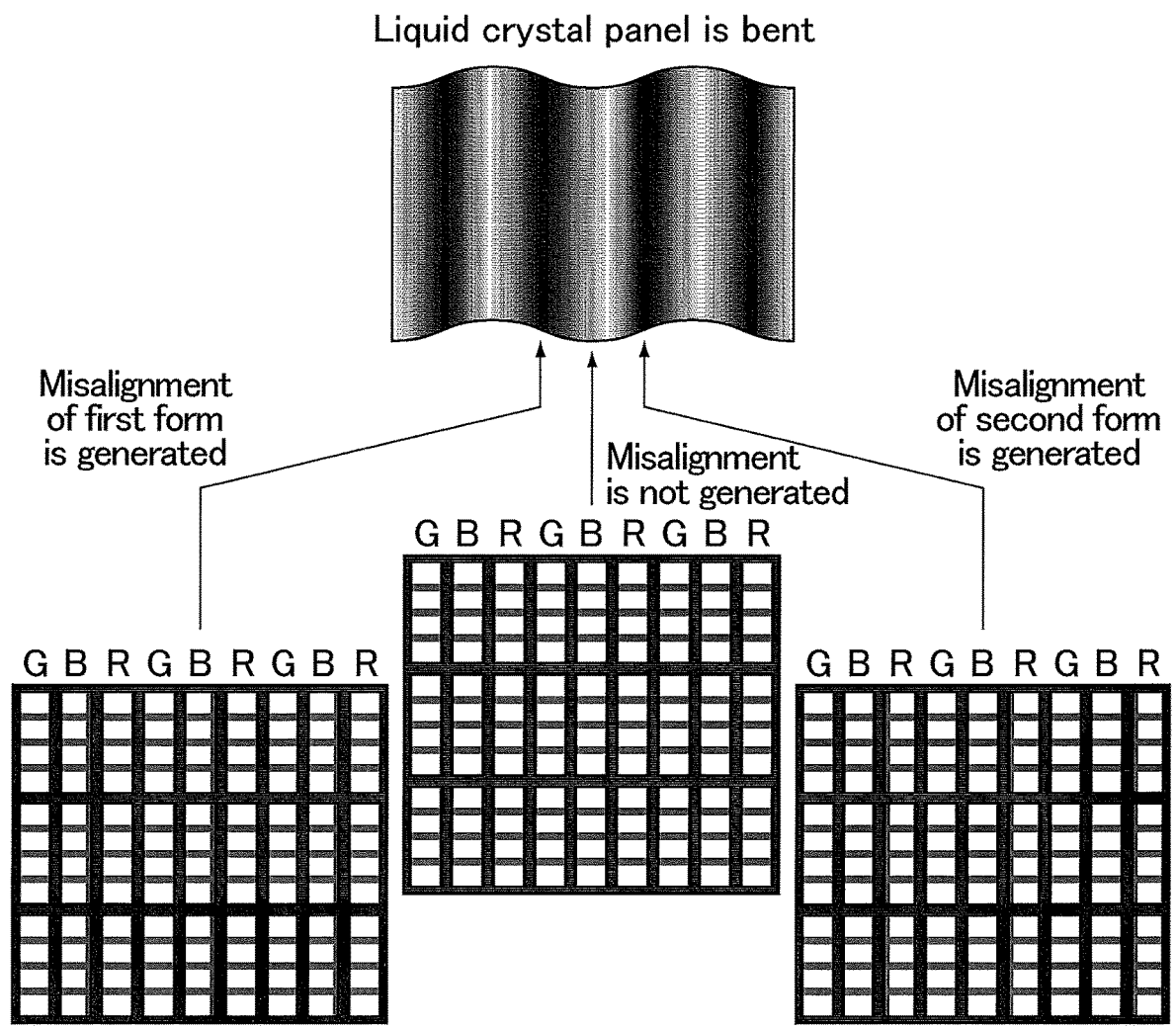
Figure 27A:
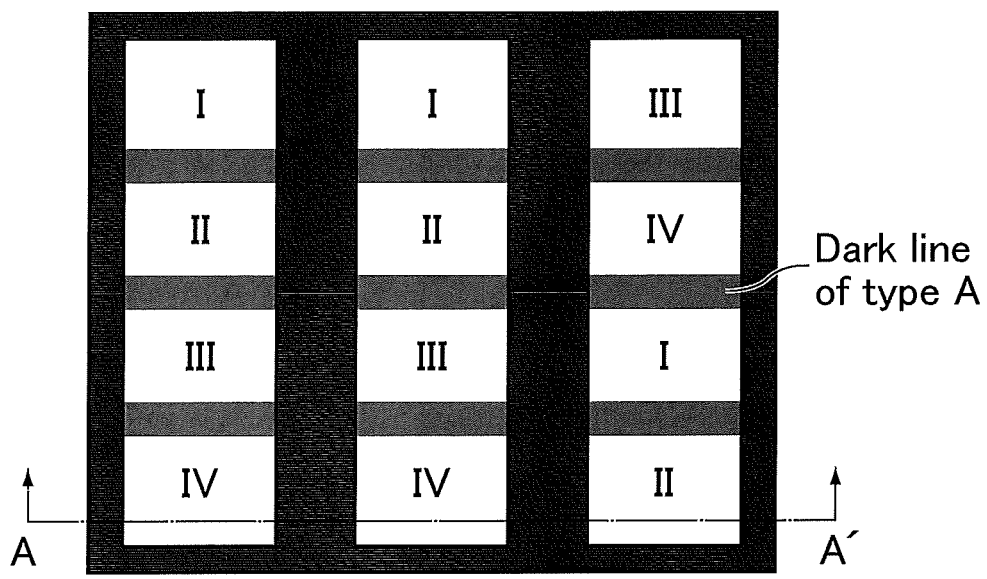
FIGS. 27A and 27B are views each illustrating the state of the dark line in a portion in which the misalignment is not generated in the third conventional liquid crystal panel.
Figure 27B:
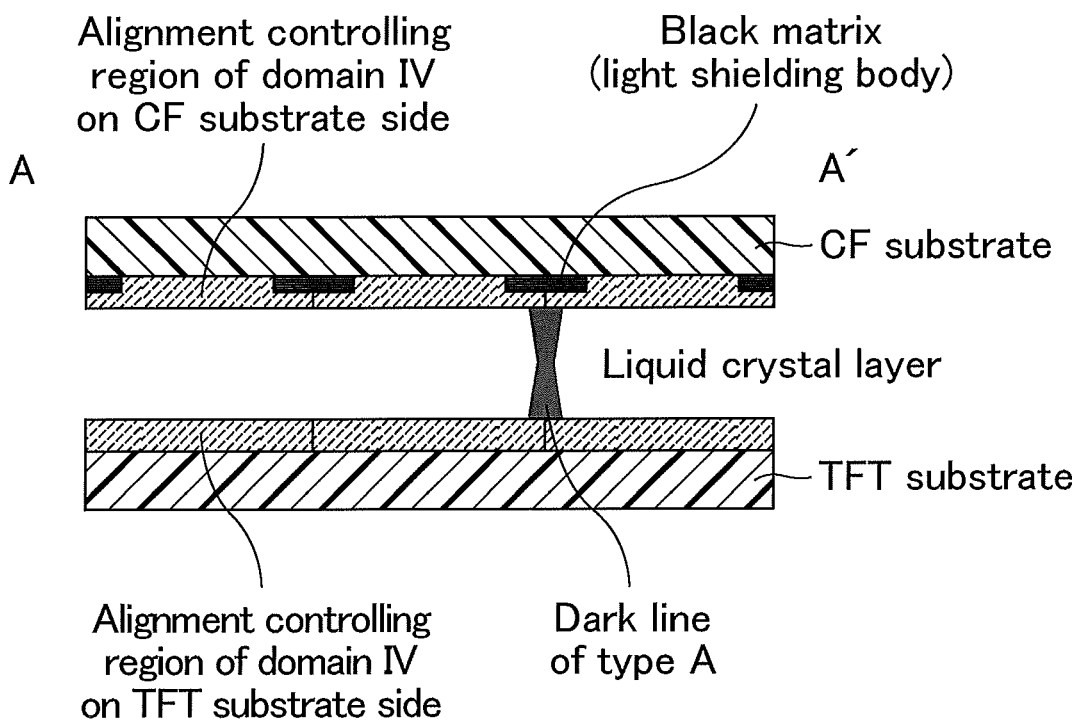
Figure 28A:
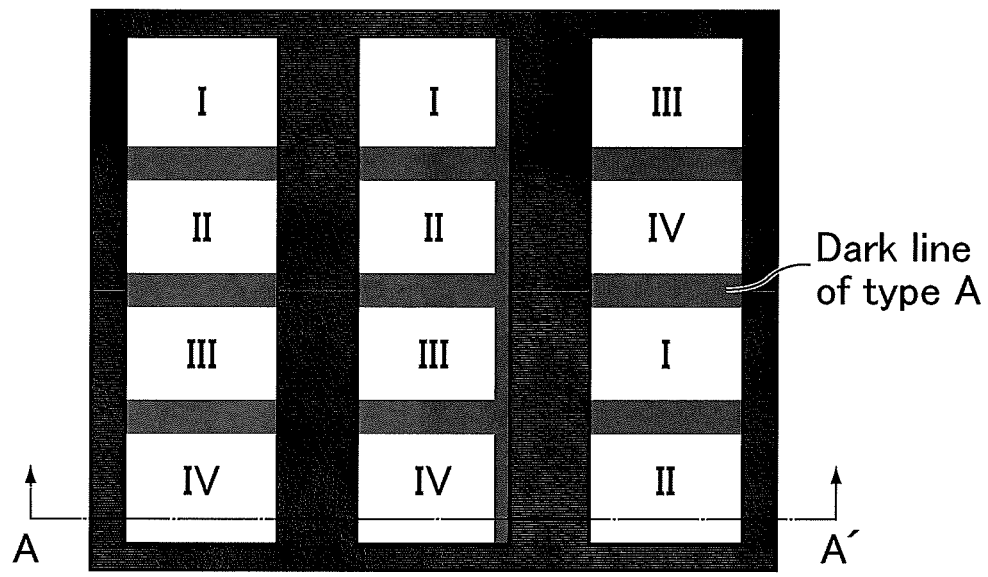
FIGS. 28A and 28B are views each illustrating the state of the dark line in a portion in which the misalignment of the first form is generated in the third conventional liquid crystal panel.
Figure 28B:
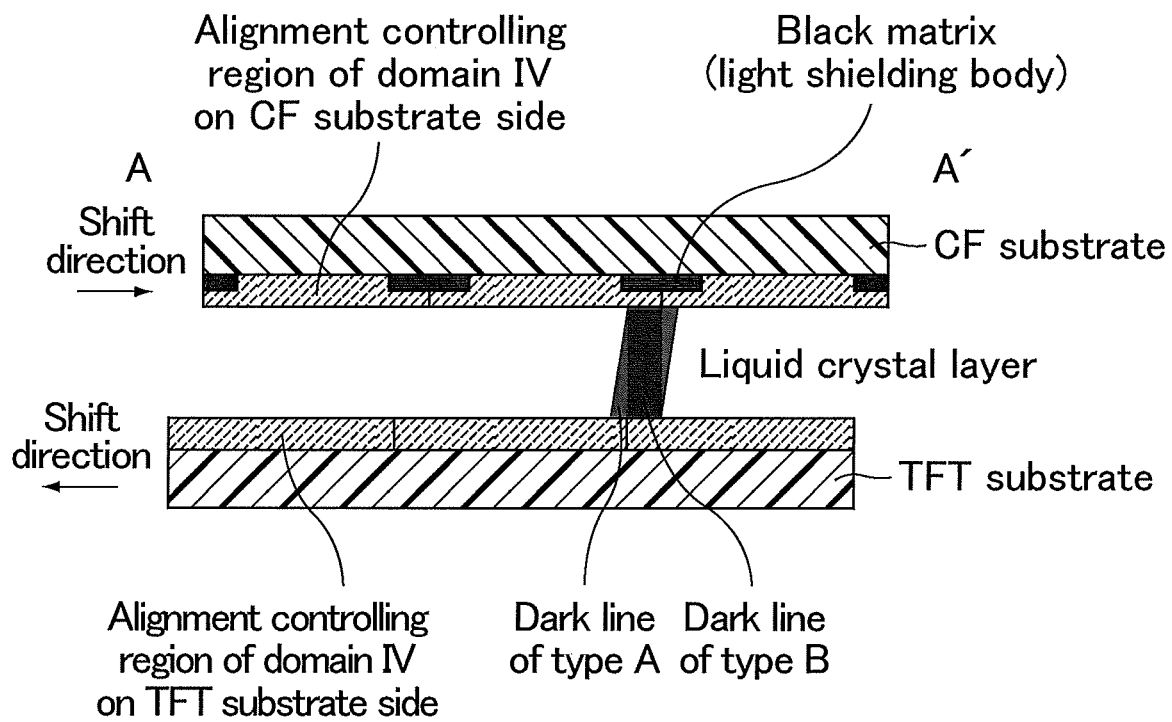
Figure 29A:
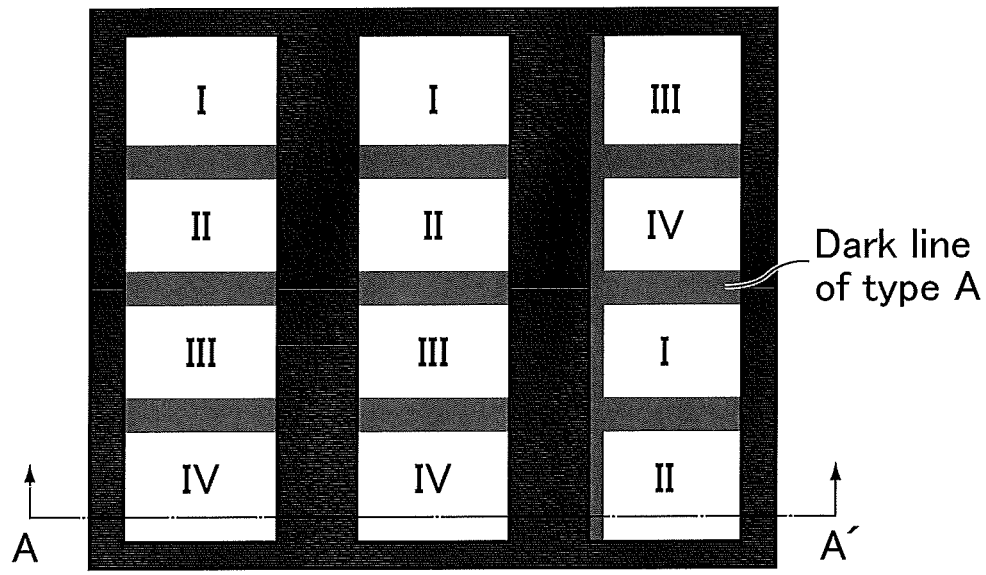
FIGS. 29A and 29B are views each illustrating the state of the dark line in a portion in which the misalignment of the second form is generated in the third conventional liquid crystal panel.
Figure 29B:
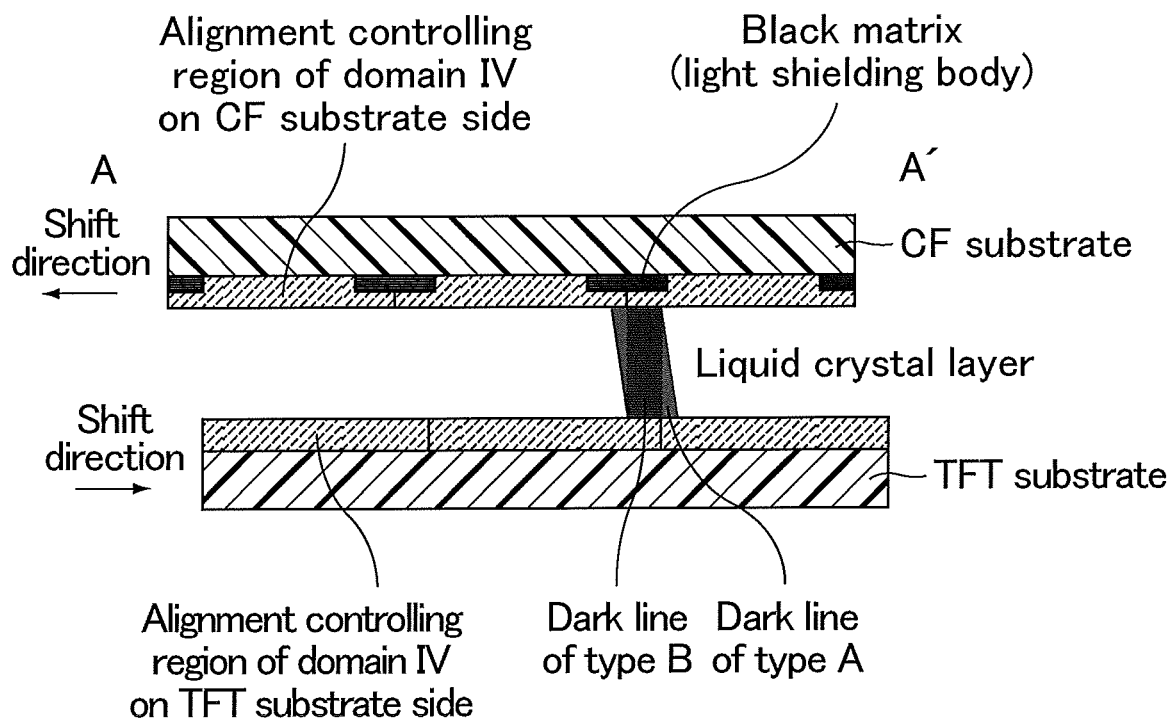

FIGS. 26A and 26B are views each illustrating the case that a third conventional liquid crystal panel is bent, FIG. 26A illustrates the state in which the third conventional liquid crystal panel is not bent, and FIG. 26B illustrates the state in which the third conventional liquid crystal panel is bent. As illustrated in FIG. 26B, the display defect is generated in the portion in which the misalignment of the first form is generated and the portion in which the misalignment of the second form is generated. FIGS. 27A and 27B are views each illustrating the state of the dark line in a portion in which the misalignment is not generated in the third conventional liquid crystal panel, FIG. 27A is a plan view of the pixel, and FIG. 27B is a cross-sectional view taken along line A-A'. As illustrated in FIGS. 27A and 27B, the dark line of the type A is generated only in the domain boundary region. FIGS. 28A and 28B are views each illustrating the state of the dark line in a portion in which the misalignment of the first form is generated in the third conventional liquid crystal panel, FIG. 28A is a plan view of the pixel, and FIG. 28B is a cross-sectional view taken along line A-A'. As illustrated in FIGS. 28A and 28B, in a portion, in which the third conventional liquid crystal panel is bent, and the TFT substrate is shifted onto the left side while the CF substrate is shifted onto the right side, thereby generating the misalignment of the first form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body. Because the dark line of the type A appears in the pixel having a specific color, a color shift is generated as compared with the portion in which the misalignment is not generated. FIGS. 29A and 29B are views each illustrating the state of the dark line in a portion in which the misalignment of the second form is generated in the third conventional liquid crystal panel, FIG. 29A is a plan view of the pixel, and FIG. 29B is a cross-sectional view taken along line A-A'. As illustrated in FIGS. 29A and 29B, in a portion, in which the third conventional liquid crystal panel is bent, and the TFT substrate is shifted onto the right side while the CF substrate is shifted onto the left side, thereby generating the misalignment of the second form, not only the dark line of the type A is generated in the domain boundary region, but also the dark line of the type B generated in the region where the liquid crystal alignment becomes abnormal is generated by the mismatching of the alignment controlling regions on the TFT substrate side and the CF substrate side due to the misalignment of the upper and lower substrates. As a result, the dark line of the type A, which is hidden while overlapping the black matrix (light shielding body) in the state in which the misalignment is not generated, appears outside the light shielding body. Because the dark line of the type A appears in the pixel having a specific color, a color shift is generated as compared with the portion in which the misalignment is not generated.

Figure 4:
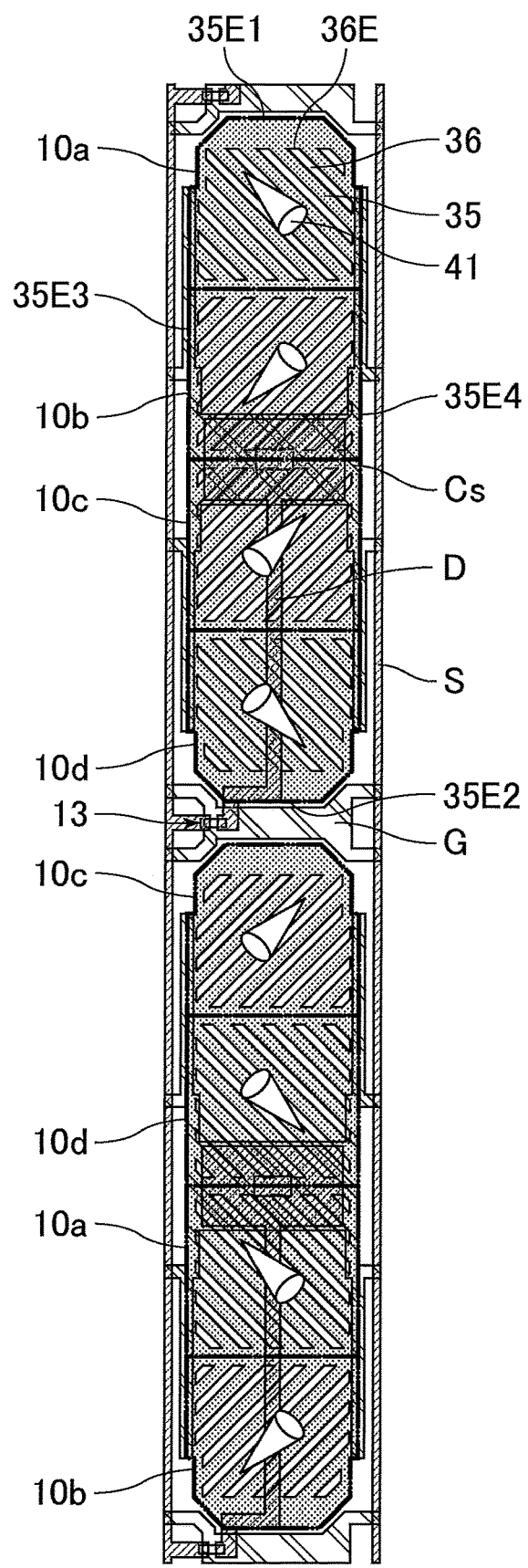
FIG. 4 is a schematic plan view illustrating the oblique azimuth of the liquid crystal molecules in the liquid crystal layer of the embodiment while the oblique azimuth is superposed on an electrode and line structure of a first substrate.

An outline of the configuration of the liquid crystal display device of the embodiment will be described below. The first substrate 30 is an active matrix substrate (TFT substrate), and the active matrix substrate that is commonly used in the field of the liquid crystal panel can be used as the first substrate 30. FIG. 4 is a schematic plan view illustrating the oblique azimuth of the liquid crystal molecules 41 in the liquid crystal layer 40 of the embodiment while the oblique azimuth is superposed on an electrode and line structure of the first substrate 30. A configuration in which multiple gate lines G parallel to each other; multiple source lines S that extend in a direction orthogonal to the gate line G and are formed in parallel to each other; an active element such as a TFT 13 disposed at an intersection of the gate line G and the source line S; multiple drain lines D disposed in the region sectioned by the gate line G and the source line S; and the pixel electrodes 35 are provided on a transparent substrate 31 in a plan view of the first substrate 30. A capacitance line Cs may be disposed in parallel to the gate line G. In the cross section of the first substrate 30, an insulating film 32 such as a gate insulating film and an interlayer insulating film is provided between the gate line G and the pixel electrode 35.

A TFT in which a channel is formed using an oxide semiconductor is suitably used as the TFT 13. Examples of the oxide semiconductors include a compound (In—Ga—Zn—O) containing indium (In), gallium (Ga), zinc (Zn), and oxygen (O), a compound (In—Sn—Zn—O) containing indium (In), tin (Sn), zinc (Zn), and oxygen (O), and a compound (In—Al—Zn—O) containing indium (In), aluminum (Al), zinc (Zn), and oxygen (O).

The pixel electrode 35 is preferably made of a transparent conductive material. Examples of the transparent conductive materials include indium tin oxide (ITO) and indium zinc oxide (IZO).

Each of the pixel electrodes 35 is superimposed on the first domain 10a, the second domain 10b, the third domain 10c, and the fourth domain 10d. Thus, when the voltage is applied to the liquid crystal layer 40, an electric field having the same magnitude is applied in a thickness direction of the liquid crystal layer 40 in the first domain 10a, the second domain 10b, the third domain 10c, and the fourth domain 10d.

Multiple fine slits 36 parallel to the alignment vectors of the first, second, third, and fourth domains 10a, 10b, 10c, 10d superimposed on the pixel electrodes 35 are provided in each of the pixel electrodes 35. As used herein, the fine slits 36 mean multiple pairs in each of which the slit portion (opening portion) and electrode that extend in a direction parallel to the desired alignment direction (alignment vector) of the liquid crystal are paired. The fine slits 36 generate electric field distortion having a groove-shaped equipotential surface parallel to the extending direction of the slit portion. The electric field formed by the fine slits 36 has a lateral electric field component that is parallel to the substrate surface and is perpendicular to the extending direction of the slit portion. The alignment direction of the liquid crystal molecules 41 changes due to the lateral electric field component, and the liquid crystal molecules 41 are aligned in parallel to the slit.

In the first substrate 30, the pixel electrode 35 is disposed in each pixel 10, and at least one gate line G extends between the nth row pixel and the (n+1)th row pixel. The domains in the nth row pixel are arranged in the order of the first domain 10a, the second domain 10b, the third domain 10c, and the fourth domain 10d. Thus, in the nth row pixel, the first domain 10a and the fourth domain 10d are adjacent to the gate line G. In the nth row pixel, a region where the fine slits 36 do not exist is provided at ends 35E1 and 35E2 parallel to the row direction of the pixel electrode 35, and a region where the fine slits 36 do not exist is provided at ends 35E3 and 35E4 parallel to the column direction of the pixel electrode 35. The portion having the largest width of the region where the fine slits 36 do not exist is included in both the ends 35E1 and 35E2 parallel to the row direction of the pixel electrode 35. The term "the width of the region where the fine slits 36 do not exist" corresponds to a distance from an end 36E in a longitudinal direction of the fine slit 36 to an outer edge of the pixel electrode 35. The end 36E in the longitudinal direction of the fine slit 36 is separated from the ends 35E1 and 35E2 on the side adjacent to the gate line G of the pixel electrode 35, whereby the influence of the voltage (gate voltage) of the gate signal applied to the gate line G on the inside of the liquid crystal layer 40 through the slit portion of the fine slit 36 can be reduced to suppress the display unevenness. In one of the first domain 10a and the fourth domain 10d, the effect that the display unevenness is suppressed is obtained when the end 36E in the longitudinal direction of the fine slit 36 is disposed away from the ends 35E1 and 35E2 on the side adjacent to the gate line G of the pixel electrode 35. As illustrated in FIG. 4, in both the first domain 10a and the fourth domain 10d, it is more effective that the end 36E in the longitudinal direction of the fine slit 36 is disposed away from the ends 35E1 and 35E2 on the side adjacent to the gate line G of the pixel electrode 35.

The distance from the end 36E in the longitudinal direction of the fine slit 36 to the ends 35E1 and 35E2 on the side adjacent to the gate line G of the pixel electrode 35 in the first domain 10a and the fourth domain 10d ranges preferably from 5 μm to 25 μm inclusive. The influence of the gate voltage on the liquid crystal layer 40 can sufficiently be reduced by setting the distance to 5 μm or more. A decrease in transmittance can be prevented by setting the distance to 25 μm or less.

In a plan view of the first substrate 30, the distance from the end 36E in the longitudinal direction of the fine slit 36 to the gate line G in the first domain 10a and the fourth domain 10d ranges preferably from 5 μm to 25 μm inclusive. The influence of the gate voltage on the liquid crystal layer 40 can sufficiently be reduced by setting the distance to 5 μm or more. A decrease in transmittance can be prevented by setting the distance to 25 μm or less.

Preferably a width (space) and a pitch (line+space) of the fine slits 36 satisfy the following conditions.

width (space) of fine slit 36≤5.1 μm pitch (line+space) of fine slit 36≤11 μm

More preferably the width (space) and the pitch (line+space) of the fine slits 36 satisfy the following conditions.

width (space) of the fine slit 36≤4.3 μm pitch (line+space) of fine slit 36≦8.3 μm As illustrated in FIG. 4, the domains in the (n+1)th row pixel satisfy the relationship in which the first domain 10a and the fourth domain 10d are located between the second domain 10b and the third domain 10c. Thus, in the (n+1)th row pixel, the second domain 10b and the third domain 10c are adjacent to the gate line G. Even in the (n+1)th row pixel, the region where the fine slits 36 do not exist is provided at the ends 35E1 and 35E2 parallel to the row direction of the pixel electrode 35, and the region where the fine slits 36 do not exist is provided at the ends 35E3 and 35E4 parallel to the column direction of the pixel electrode 35. The portion having the largest width of the region where the fine slits 36 do not exist is included in both the ends 35E1 and 35E2 parallel to the row direction of the pixel electrode 35. In one of the second domain 10b and the third domain 10c, the effect that the display unevenness is suppressed is obtained when the end 36E in the longitudinal direction of the fine slit 36 is disposed away from the ends 35E1 and 35E2 on the side adjacent to the gate line G of the pixel electrode 35. As illustrated in FIG. 4, in both the second domain 10b and the third domain 10c, it is more effective that the end 36E in the longitudinal direction of the fine slit 36 is disposed away from the ends 35E1 and 35E2 on the side adjacent to the gate line G of the pixel electrode 35.

Figure 5A:
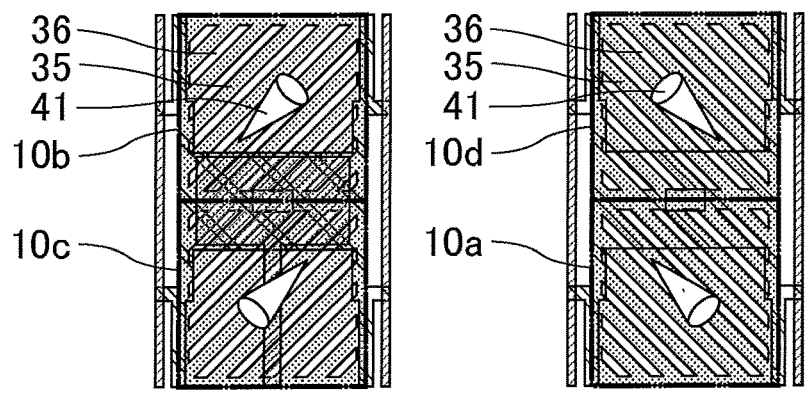
FIGS. 5A and 5B are views in which all domains included in pixels if an nth row and pixels of an (n+1)th row are organized based on an adjacent relationship with respect to a gate line G.
Figure 5B:
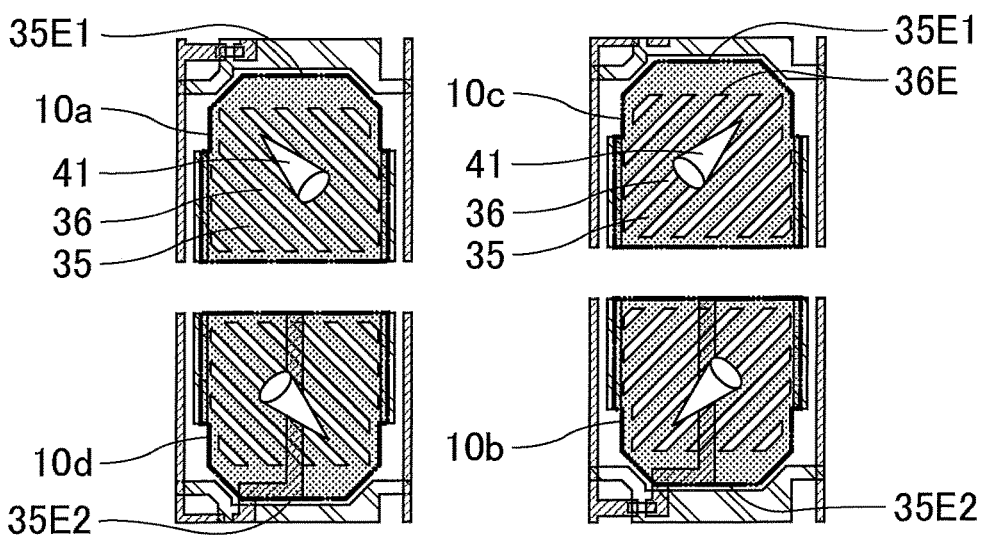

In the domain arrangement of FIGS. 2 and 4, in the nth row pixel, the first domain 10a and the fourth domain 10d are located on the end side of the pixel, and the second domain 10b and the third domain 10c are located on the center side of the pixel. In the (n+1)th row pixel, the second domain 10b and the third domain 10c are located on the end side of the pixel, and the first domain 10a and the fourth domain 10d are located on the center side of the pixel. FIGS. 5A and 5B are views in which all domains included in the nth row pixel and the (n+1)th row pixel are organized based on an adjacent relationship with respect to the gate line G, FIG. 5A illustrates a domain group that is not adjacent to the gate line G, and FIG. 5B illustrates a domain group adjacent to the gate line G; As illustrated in FIGS. 5A and 5B, each of the domain group that is not adjacent to the gate line G and the domain group adjacent to the gate line G is constructed with a combination of the first domain 10a, the second domain 10b, the third domain 10c, and the fourth domain 10d that face in directions different from one another by 90°. Consequently, the influence on the liquid crystal voltage generated in the domains adjacent to the gate line G can uniformly be dispersed in the first domain 10a, the second domain 10b, the third domain 10c, and the fourth domain 10d to suppress the generation of the display unevenness having the viewing angle dependency.

The color filter substrate (CF substrate) can be used as the second substrate 50. A configuration in which the black matrix formed into a lattice shape and a lattice, namely, the color filter formed inside the pixel 10 are provided on the transparent substrate can be cited as the configuration of the color filter substrate. The black matrix may be formed into the lattice shape in each pixel so as to overlap the boundary of the pixel 10, or formed into the lattice shape in each half pixel so as to cross the center of one pixel along the short-side direction. When the black matrix is formed so as to overlap the region where dark line is generated, the dark line is hardly observed, and the influence of the dark line on the display can be minimized.

The counter electrode 51 is disposed so as to be opposed to the pixel electrode 35 with the liquid crystal layer 40 interposed therebetween. The vertical electric field is formed between the counter electrode 51 and the pixel electrode 35 and the liquid crystal molecules 41 are inclined, which allows the display to be performed. For example, in each column, the color filters may be arranged in the order of red (R), green (G), and blue (B), in the order of yellow (Y), red (R), green (G), and blue (B), or in the order of red (R), green (G), blue (B), and green (G).

Preferably the counter electrode 51 is a planar electrode. The counter electrode 51 may be a transparent electrode. For example, the counter electrode 51 can be made of a transparent conductive material such as indium tin oxide (ITO), indium zinc oxide (IZO), zinc oxide (ZnO), and tin oxide (SnO) or an alloy thereof.

In the liquid crystal panel 100 of the embodiment, the first substrate 30 and the second substrate 50 are bonded together by the sealing material 80 that is provided so as to surround the liquid crystal layer 40, and the liquid crystal layer 40 is held in a predetermined region. For example, an epoxy resin containing an inorganic filler or an organic filler and a hardener can be used as the sealing material 80.

A polymer sustained alignment (PSA) technique may be used in the embodiment. In the PSA technique, a liquid crystal composition containing a photopolymerizable monomer is filled between the first substrate 30 and the second substrate 50, the liquid crystal layer 40 is irradiated with light to polymerize the photopolymerizable monomer, a polymer is formed on the surfaces of the first alignment film 71 and the second alignment film 72, and the initial inclination (pre-tilt) of the liquid crystal is fixed by the polymer.

As illustrated in FIG. 2, a polarization axis of the back-side polarizing plate 20 and a polarization axis of the display-side polarizing plate 60 may be orthogonal to each other. The polarization axis may be an absorption axis or a transmission axis of the polarizing plate. Typically, the back-side polarizing plate 20 and the display-side polarizing plate 60 are those obtained by adsorbing and aligning an anisotropic material such as a dichroic iodine complex onto a polyvinyl alcohol (PVA) film. Usually, a protective film such as a triacetyl cellulose film is laminated on both sides of the PVA film, and put into practical use. An optical film such as a retardation film may be disposed between the back-side polarizing plate 20 and the first substrate 30 and between the display-side polarizing plate 60 and the second substrate 50.

Any backlight that emits the light including visible light, any backlight that emits the light including only the visible light, or any backlight that emits the light including both the visible light and ultraviolet light may be used as the backlight 110. A backlight that emits white light is suitably used in order to perform color display on the liquid crystal display device. For example, a light emitting diode (LED) is suitably used as a type of the backlight 110. As used herein, the term "visible light" means light (electromagnetic wave) having a wavelength that is greater than or equal to 380 nm and less than 800 nm.

In addition to the liquid crystal panel 100 and the backlight 110, the liquid crystal display device of the embodiment includes an external circuit such as a tape-carrier package (TCP) and a printed circuit board (PCB); an optical film such as a viewing angle increasing film and a luminance improving film; and a bezel (frame). Some components may be incorporated into another component. Components other than those described above are not particularly limited and are not described here because such components can be those commonly used in the field of liquid crystal display devices.

Figure 6:
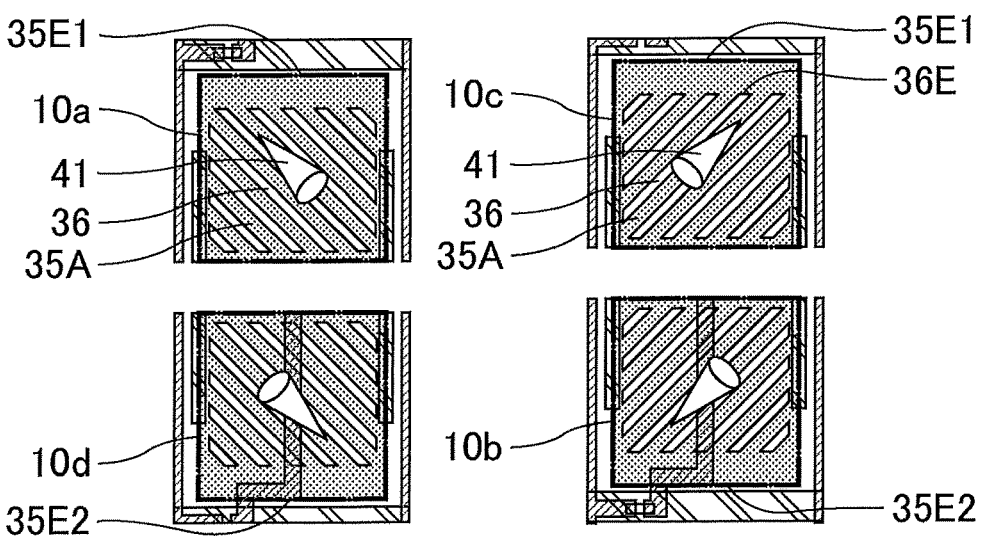
FIG. 6 is a view illustrating a modification of a pixel electrode in FIG. 5B.

The pixel electrode 35 in FIGS. 4 and 5B is provided with notches at four corners, but may be formed into a substantially rectangular shape. Consequently, as in the pixel electrode 35A in FIG. 6, the planar shapes of the first domain 10a and the fourth domain 10d can be formed into the same substantially rectangular shape as the planar shapes of the second domain 10b and the third domain 10c. FIG. 6 is a view illustrating a modification of the pixel electrode 35 in FIG. 5B.

Figure 7:
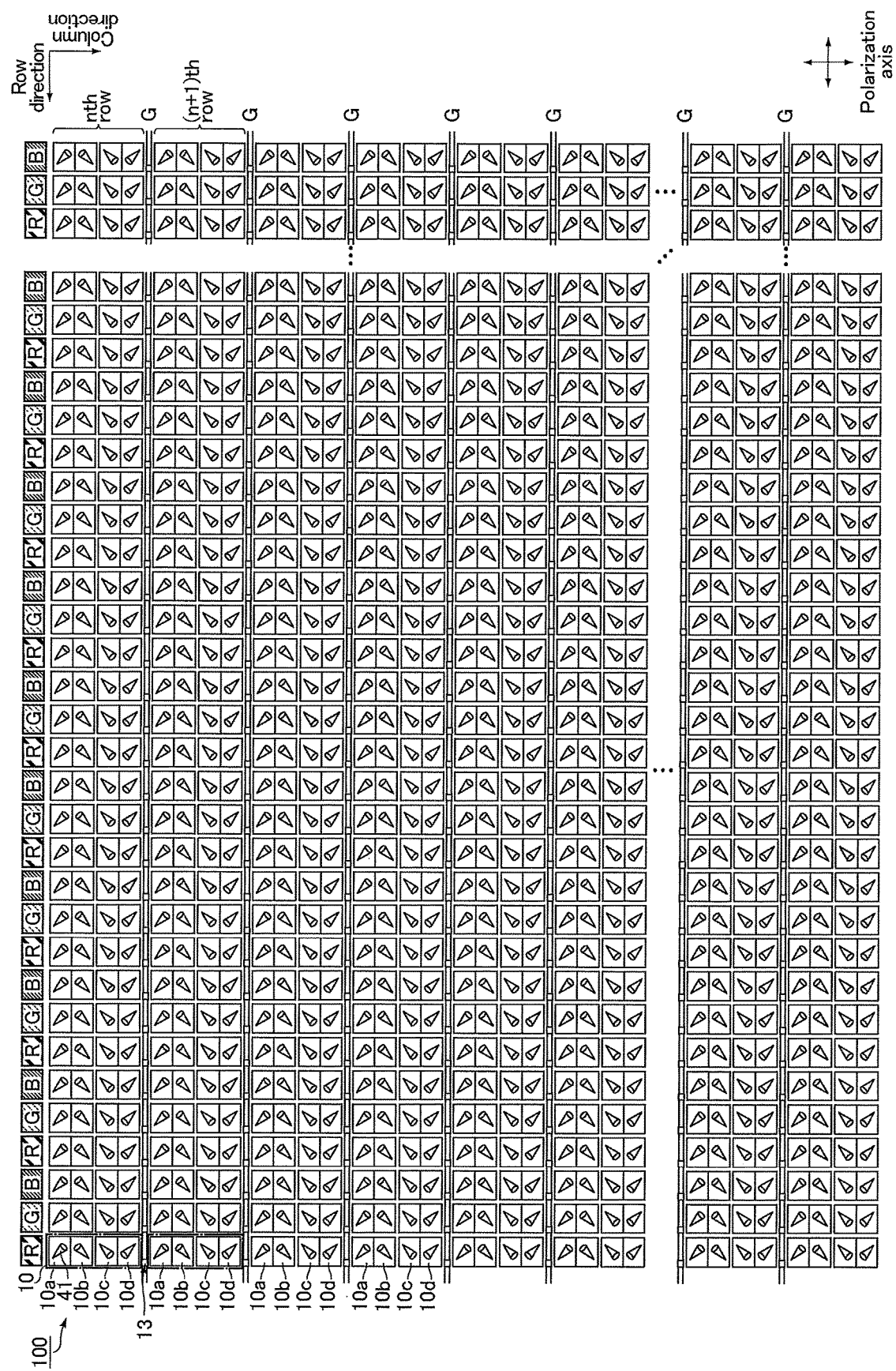
FIG. 7 is a schematic plan view illustrating an arrangement relation of the oblique azimuth of liquid crystal molecules in a liquid crystal layer and the color filter of the second substrate of the modification.

FIG. 7 is a schematic plan view illustrating an arrangement relation of the oblique azimuth of the liquid crystal molecules 41 in the liquid crystal layer 40 and the color filter of the second substrate 50 of the modification. In the liquid crystal panel 100 of FIGS. 2 and 4, the domain array in the nth row pixel and the domain array in the (n+1)th row pixel are made different from each other, and the combination of the four domains included in the domain group that is not adjacent to the gate line G and the combination of the four domains included in the domain group adjacent to the gate line G are matched with each other. Alternatively, as illustrated in FIG. 7, the domains in all the pixels 10 may be arranged in the order of the first domain 10a, the second domain 10b, the third domain 10c, and the fourth domain 10d. That is, in all the pixels 10, the first domain 10a and the fourth domain 10d may be adjacent to the gate line G, and the second domain 10b and the third domain 10c may not be adjacent to the gate line G. Even in this case, in all the pixels 10, the influence of the gate voltage on the liquid crystal voltage can be suppressed when the end 36E in the longitudinal direction of the fine slit 36 in the first domain 10a and the fourth domain 10d is disposed away from the ends 35E1 and 35E2 on the side adjacent to the gate line G of the pixel electrode 35.

In the liquid crystal panel 100 of the embodiment, the generation of the display unevenness having the viewing angle dependency can be suppressed. The reason is as follows.

Figure 13:
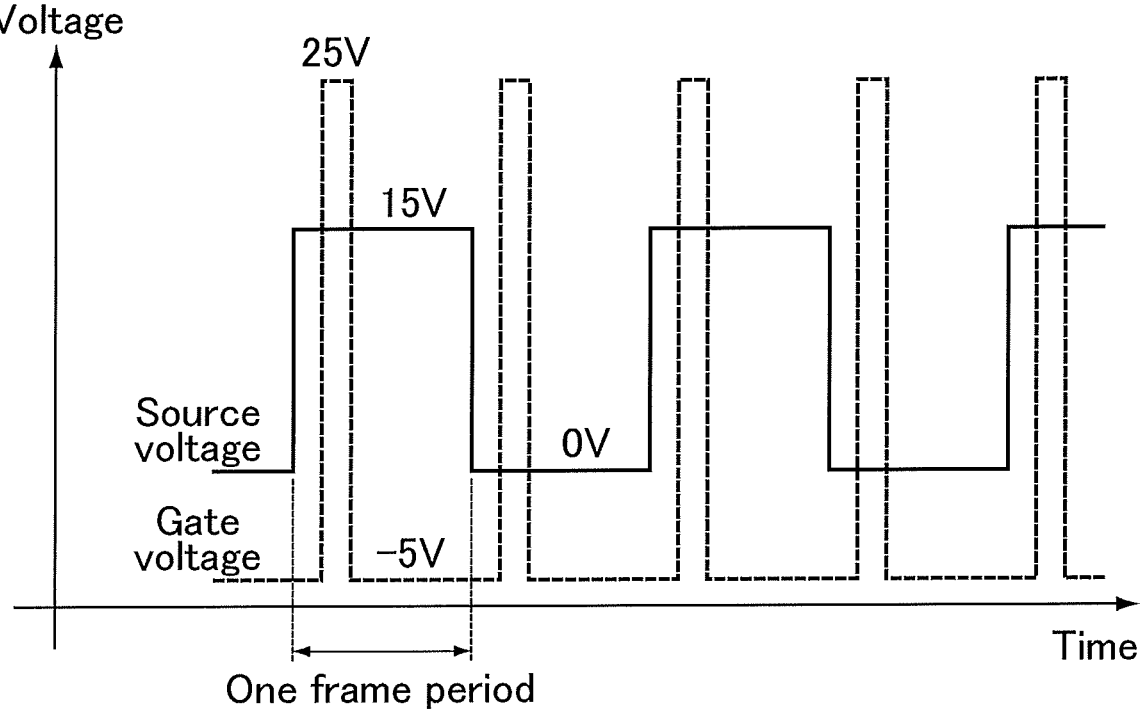
FIG. 13 is a waveform chart schematically illustrating an example of a waveform of voltage applied to a general liquid crystal panel.

In the liquid crystal panel 100 during the display, the voltage is applied to the liquid crystal layer 40 through the pixel electrode 35. In the case that the fine slits 36 are provided in the pixel electrode 35, the gate line voltage (gate voltage) applied to the gate line G through the slit portion also influences the inside of the liquid crystal layer 40. FIG. 13 is a waveform chart schematically illustrating an example of a waveform of the voltage applied to a general liquid crystal panel. As illustrated in FIG. 13, because usually the value and the waveform of the gate voltage (−5 V to 25 V) are largely different from the value and the waveform of the voltage (0 V to +15 V) applied to the liquid crystal layer 40 through the pixel electrode 35, the inside of the liquid crystal layer 40 is influenced through the slit portion even if the gate line G is separated from the liquid crystal layer 40 by the insulating film 32 such as the gate insulating film and the interlayer insulating film. Because a degree of influence by the gate voltage varies depending on the distance from the gate line G, the domain that is not adjacent to the gate line G and the domain adjacent to the gate line G are different from each other in the degree of influence by the gate voltage. In a general pixel structure, while the domain adjacent to the gate line G is influenced by the gate line G, the influence of the gate line G on the domain that is not adjacent to the gate line G is negligibly small, namely, substantially zero. In the domain adjacent to the gate line G, because the degree of influence of the gate voltage varies depending on the variation in line width of the slit portion and the variation in width of the gate line, a difference in luminance is generated, and the display unevenness is generated.

For this reason, in the embodiment, in one of the first domain 10a and the fourth domain 10d, the end 36E in the longitudinal direction of the fine slit 36 is disposed away from the ends 35E1 and 35E2 on the side adjacent to the gate line G of the pixel electrode 35 as illustrated in FIG. 4. Consequently, the influence on the liquid crystal voltage generated in the domain adjacent to the gate line G can be reduced to suppress the generation of the display unevenness having the viewing angle dependency.

A method of manufacturing the liquid crystal panel 100 of the embodiment will be described below. The method of manufacturing the liquid crystal panel 100 of the embodiment is not particularly limited, but a method usually used in the field of the liquid crystal panel can be adopted. The gate line G and the pixel electrode 35 that are provided on the first substrate 30 and the color filter provided on the second substrate 50 can be formed by photolithography.

From the viewpoints of patterning accuracy and productivity, the photolithography is suitably used as the method of forming the pixel electrode 35 having the fine slits 36. In the case that the fine slits 36 are formed by the photolithography, a photosensitive resin (photoresist) formed on the conductive film that constitutes a material of the pixel electrode 35 is irradiated with light through a mask having a pattern corresponding to the fine slits 36. The photoresist may be irradiated with the light through multiple lenses (multi-lens).

Figure 8:
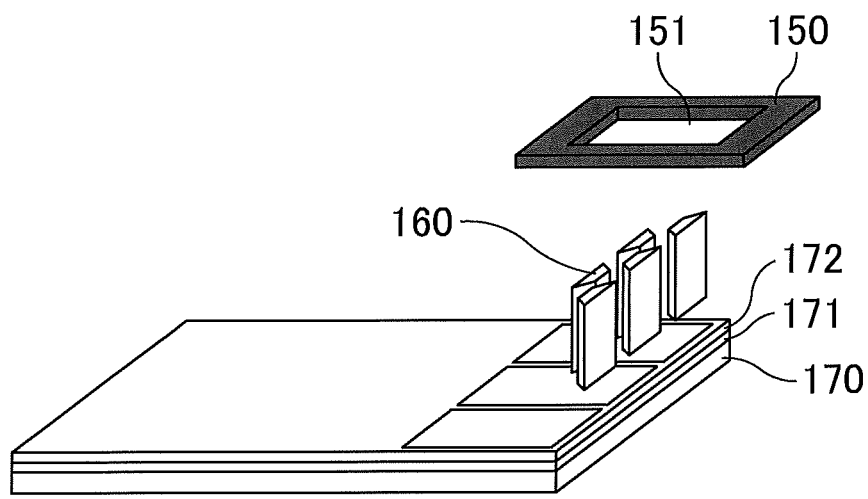
FIG. 8 is a view illustrating photolithography using a multi-lens.

The case that the photoresist is irradiated with the light used for the patterning of the fine slits 36 through the multi-lens will be described with reference to the drawings. FIG. 8 is a view illustrating the photolithography using the multi-lens. As illustrated in FIG. 8, exposure is performed on a substrate 170 through a mask 150 including a pattern formation region 151 where a light shielding pattern or a light transmitting pattern corresponding to the fine slit 36 is formed and a multi-lens 160 including the lenses. A substrate on which a photoresist 172 is formed on a conductive film 171 that constitutes the material of the pixel electrode 35 is used as the substrate 170. An exposure system is preferably scanning exposure that is performed while at least one of an exposure unit including the mask 150 and the multi-lens 160 and the substrate 170 is moved. Development of the photoresist 172, etching of the conductive film 171, and peeling of the photoresist 172 are sequentially performed after the exposure.

Figure 9A:
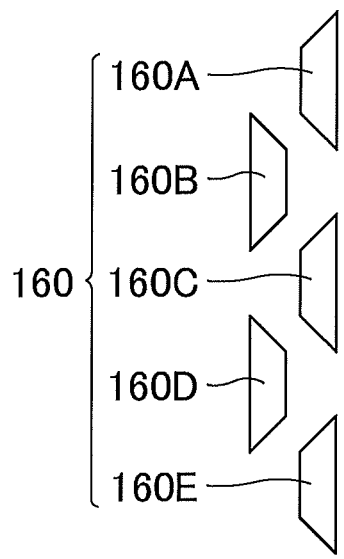
FIG. 9A is a schematic cross-sectional view illustrating an arrangement relation of the lenses in the multi-lens.
Figure 9B:
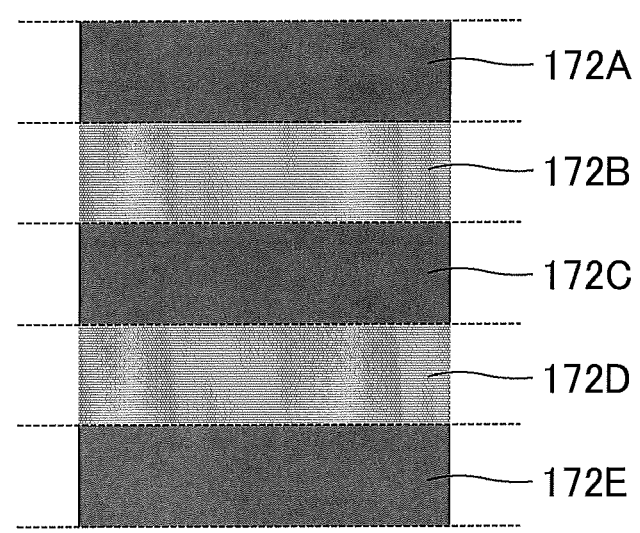
FIG. 9B is a conceptual view illustrating a pattern of luminance unevenness generated by scanning exposure in which the multi-lens in FIG. 9A is used when the pixel electrode including fine slits and the gate line are formed.

When the exposure is performed using the multi-lens 160, a focal point or illuminance of each lens may vary. FIG. 9A is a schematic cross-sectional view illustrating an arrangement relation of lenses 160A, 160B, 160C, 160D, 160E in the multi-lens 160, and FIG. 9B is a conceptual view illustrating a pattern of the luminance unevenness generated when the pixel electrode 35 including fine slits 36 and the gate line G are formed by the scanning exposure in which the multi-lens 160 in FIG. 9A is used. In the case that a difference in a focal point or illuminance exists among the lenses 160A, 160B, 160C, 160D, 160E when the scanning exposure is performed with the arrangement of the lenses 160A, 160B, 160C, 160D, 160E in FIG. 9A, the line width of the fine slits 36 and the width of the gate line vary in exposure regions 172A, 172B, 172C, 172D, 172E corresponding to the lenses 160A, 160B, 160C, 160D, 160E as illustrated in FIG. 9B. As a result, the luminance of the liquid crystal panel 100 varies in each of the exposure regions 172A, 172B, 172C, 172D, 172E, and is sometimes recognized as the display unevenness. In particular, because the boundary between the adjacent exposure regions 172A, 172B, 172C, 172D, 172E is a portion in which the line width of the fine slits 36 and the width of the gate line change, the boundary is recognized as seam-shaped display unevenness to degrade the display quality of the liquid crystal panel 100.

On the other hand, in the liquid crystal panel 100 of the embodiment, as described above, the voltage of the gate signal applied to the gate line G acts in the liquid crystal layer 40 through the slit portion, whereby the generation of the display unevenness is reduced by adjusting the arrangement of the fine slits 36. Thus, the influence of the variation in line width of the fine slits 36 on the display quality is also suppressed. In the case that the domain array in the nth row pixel and the domain array in the (n+1)th row pixel are different from each other, because a repeating unit of the domain array is not one row (four domains) but two rows (eight domains), the boundary between the exposure regions 172A, 172B, 172C, 172D, 172E is hardly recognized as the seam-shaped display unevenness as compared with the case that the domain arrays of each row are equal to each other.

A photo alignment film can also be used for one or both of the first alignment film 71 and the second alignment film 72. In this case, the alignment treatment performed on the photo alignment film can be performed by the photo alignment treatment in which the photo alignment film is irradiated with light (electromagnetic wave) such as ultraviolet light and visible light. For example, the photo alignment treatment is performed using a device, which includes a light source that emits the light to the first alignment film 71 and the second alignment film 72 and has a function of performing continuous scanning exposure over the pixels. Examples of specific modes of the scanning exposure include a mode in which a substrate surface is irradiated with the light emitted from the light source while the substrate is moved, a mode in which the substrate surface is irradiated with the light emitted from the light source while the light source is moved, and a mode in which the substrate surface is irradiated with the light emitted from the light source while the light source and the substrate are moved.

Figure 10:
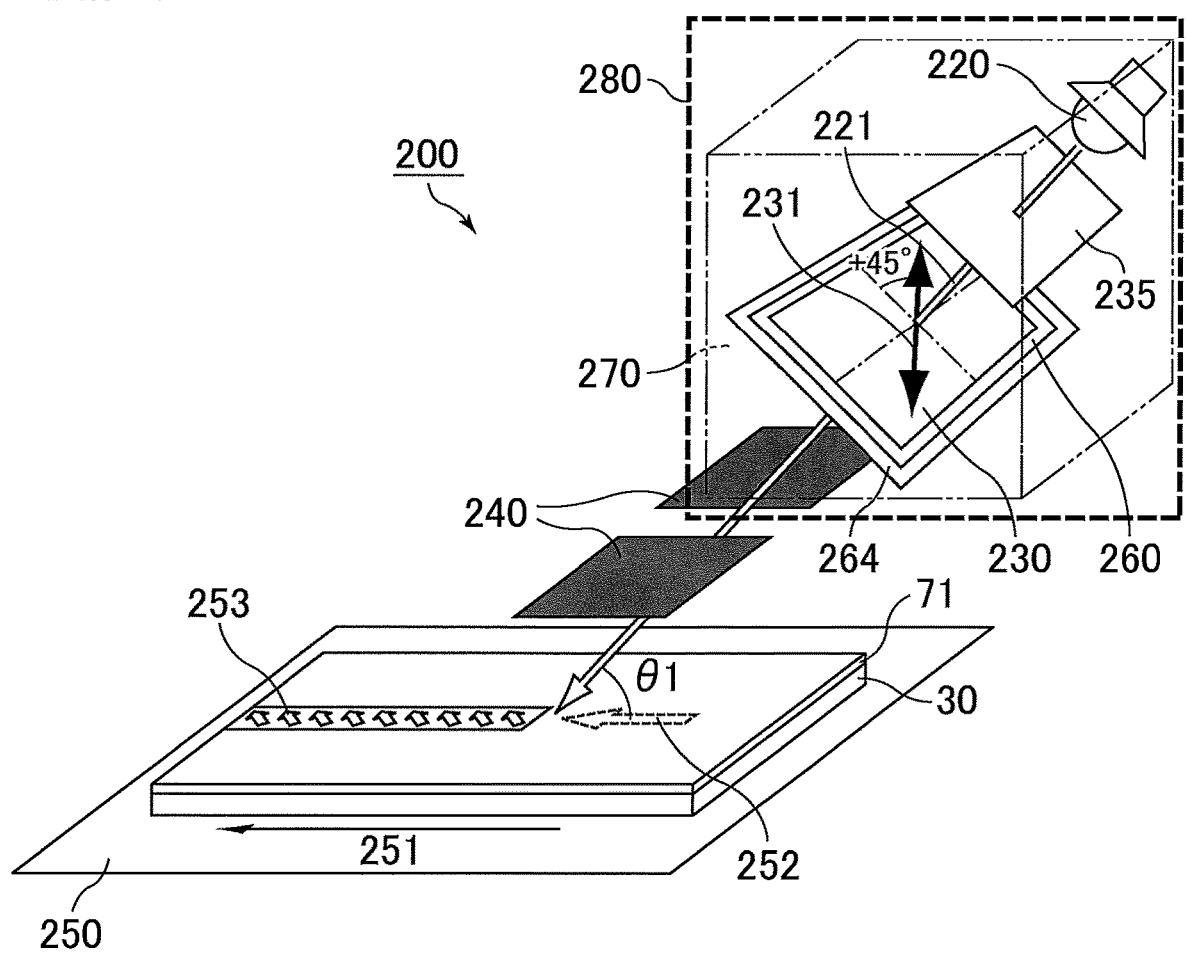
FIG. 10 is a schematic diagram illustrating an example of a photo alignment treatment device.

A specific example of the alignment treatment will be described below. FIG. 10 is a schematic diagram illustrating an example of the photo alignment treatment device. A photo alignment treatment device 200 in FIG. 10 performs the photo alignment treatment on the photo alignment film formed on the liquid crystal panel substrate. Although the first alignment film 71 formed on the first substrate (liquid crystal panel substrate) 30 is illustrated in FIG. 10, the second alignment film 72 can also be processed. The photo alignment treatment device 200 includes a light irradiation mechanism 280 and a stage 250 on which the liquid crystal panel substrate 30 is placed.

The light irradiation mechanism 280 includes a light source 220, a polarizer 230, and a rotation adjustment mechanism 260. The light source 220 and the polarizer 230 may be disposed in a lamp box 270. A type of the light source 220 is not particularly limited, but a light source typically used in the field of the photo alignment treatment device can be used. For example, a low-pressure mercury lamp, a deuterium lamp, a metal halide lamp, an argon resonance lamp, and a xenon lamp can be used.

Light 221 emitted from the light source 220 may be light (electromagnetic wave) such as ultraviolet light and visible light, and the light 221 preferably has a wavelength of 280 nm to 400 nm.

For example, the polarizer 230 extracts linearly polarized light from the light emitted from the light source 220 toward the liquid crystal panel substrate 30. The polarization axis means to transmission axis or an absorption axis of the polarizer. Examples of the polarizer 230 include an organic resin polarizer, a wire grid polarizer, and a polarizing beam splitter (PBS).

A polarizer obtained by adsorbing iodine in polyvinyl alcohol and extending polyvinyl alcohol in a sheet shape can be cited as an example of the organic resin polarizer.

For example, the wire grid polarizer includes a light transmission base material and multiple metal thin wires formed on the light transmission base material, and the metal thin wires are disposed in a period shorter than the wavelength of light incident on the wire grid polarizer. The metal thin wire is made of a light absorbing metal material such as chromium. When the wire grid polarizer is irradiated with the light while superimposed on the liquid crystal panel substrate 30, the liquid crystal molecules are aligned at the azimuth orthogonal to an extending azimuth of the metal thin wire. In the case that the polarizer 230 is the wire grid polarizer, the polarization axis is the azimuth orthogonal to the extending azimuth of the metal thin wire. Alignment division treatment can efficiently be performed using the wire grid polarizer having a different extending azimuth of the metal thin wire.

A cube type polarization beam splitter or a plate type polarization beam splitter can be cited as an example of the polarization beam splitter. A PBS, in which slopes of two prisms are bonded together and an optical thin film is evaporated on one of the slopes, can be cited as an example of the cube type PBS.

The polarizer 230 may be disposed perpendicular to the light irradiation axis. In the case that the polarizer 230 is not disposed perpendicularly to the light irradiation axis, sometimes the alignment of the liquid crystal molecules is influenced by a waveguide effect in the polarizer 230. The light irradiation axis is a direction in which the light 221 emitted from the light source 220 toward the liquid crystal panel substrate 30 propagates linearly. The disposition of the polarizer perpendicular to the light irradiation axis means that the polarizer is disposed such that the light is emitted from a normal direction of the polarizer toward the liquid crystal panel substrate, and the term "perpendicular" means a range in which an angle formed between the normal line of the polarizer and the light irradiation axis is less than 0.5°.

A wavelength selection filter 235 may be included between the light source 220 and the polarizer 230. A main wavelength of the light emitted through the wavelength selection filter 235 may range from 280 nm to 400 nm. The selection wavelength of 280 nm to 400 nm can generate a structural change of a material, which constitutes the first alignment film 71 and exhibits the photo alignment characteristic, and exert the alignment controlling force. Intensity of the light emitted from the light source may range from 10 $mJ/cm^2$ to 100 $mJ/cm^2$.

The wavelength selection filter 235 is not particularly limited, and a wavelength selection filter typically used in the field of the photo alignment treatment device can be used. A wavelength selection filter in which a substance absorbing a wavelength other than the transmission wavelength is dispersed in the filter or a wavelength selection filter in which a substance reflecting a wavelength other than the transmission wavelength is coated on the surface of the filter can be cited as an example of the wavelength selection filter 235.

The light irradiation angle with respect to the liquid crystal panel substrate 30 may range from 30° to 60°. The irradiation angle is represented by θ1 in FIG. 11, and is an angle formed between a plane of the liquid crystal panel substrate 30 and the light irradiation axis in the case that the surface of the liquid crystal panel substrate 30 is set to 0° and in the case that the normal line of the liquid crystal panel substrate 30 is set to 90°.

An extinction ratio of the polarizer may range from 50:1 to 500:1. The extinction ratio is represented by Tmax:Tmin, where Tmax is maximum transmittance in the case that the polarizer is irradiated with the light and Tmin is minimum transmittance obtained by rotating the polarizer by 90°. The light in the desired polarization axis direction is taken out with increasing extinction ratio (a value of Tmax in the case that Tmin is set to 1), so that a variation in oblique azimuth of the liquid crystal molecules can be reduced.

The rotation adjustment mechanism 260 rotates a polarization axis 231 of the polarizer 230, and adjusts an exposure direction 253 on the surface of the liquid crystal panel substrate 30 so as to substantially become 45° with respect to a light irradiation direction 252. By setting the exposure direction 253 to substantially 45° with respect to the light irradiation direction 252, the photo alignment treatment can be performed on the liquid crystal panel substrate 30 by scanning exposure having excellent productivity while a movement direction 251 of the liquid crystal panel substrate 30 is kept in parallel to the light irradiation direction 252. As illustrated in FIG. 10, the light irradiation direction 252 means a light traveling direction in the case that the light 221 emitted from the light source 220 is projected onto the surface of the liquid crystal panel substrate 30. The exposure direction 253 means a vibration direction of polarized light emitted from the light source 220 to the surface of the liquid crystal panel substrate 30 through the polarizer 230. A pre-tilt azimuth that the alignment film 70 formed on the surface of the liquid crystal panel substrate 30 provides to the liquid crystal molecules is fixed by the exposure direction 253.

For example, the polarization axis 231 is adjusted using the rotation adjustment mechanism 260 by the following method. The polarizer 230 is set such that the polarization axis 231 becomes 45° with respect to the light irradiation direction 252. The azimuth of the polarization axis before the polarization axis is adjusted by the rotation adjustment mechanism is also referred to as "a 45° azimuth". Subsequently, the rotation adjustment mechanism 260 rotates the polarizer 230 from the 45° azimuth to adjust the azimuth of the polarization axis 231 based on data calculated by geometric computation in consideration of the light irradiation angle with respect to the liquid crystal panel substrate and a refractive index of the alignment film material. The rotation adjustment mechanism 260 can match the azimuth of the polarization axis of the polarizer with respect to the light irradiation direction with the exposure direction on the surface of the liquid crystal panel substrate to set the oblique azimuth of the liquid crystal molecules in the liquid crystal panel to a desired angle. When the photo alignment treatment is performed with no use of the rotation adjustment mechanism 260 while the polarization axis 231 is fixed to the 45° azimuth, sometimes the oblique azimuth of the liquid crystal molecules deviates by about 10° from about 45°.

The rotation adjustment mechanism 260 may rotate the polarization axis of the polarizer 230 in the range of −15° to +15° from the 45° azimuth. When the rotation adjustment mechanism 260 rotates the polarization axis in the range of −15° to +15°, even if the light irradiation angle is changed with respect to the liquid crystal panel substrate 30, the exposure direction 253 can be adjusted to set the oblique azimuth of the liquid crystal molecules to the desired angle. For example, the polarization axis 231 is rotated from the 45° azimuth by +7.55° and set to 52.55° in order to adjust the exposure direction 253 on the surface of the liquid crystal panel substrate to substantial 45° with respect to the light irradiation direction 252.

The photo alignment treatment device 200 may further include a rotation mechanism 264. The rotation mechanism 264 can rotate the polarization axis 231 of the polarizer 230 by selecting either substantial 45° or substantial 90° from the 45° azimuth. In the case that the azimuth of 45° is set to the +45° azimuth clockwise with respect to the light irradiation direction 252, the rotated polarization axis 231 becomes the −45° azimuth with respect to the light irradiation direction 252 when the polarization axis 231 of the polarizer 230 is rotated by 90° from the +45° azimuth. The polarization axis 231 is rotated by 90° from the +45° azimuth and adjusted by the rotation adjustment mechanism 260, which allows the light irradiation to be performed while the exposure direction 253 is set to substantial 45° with respect to the light irradiation direction 252 before and after the rotation. Consequently, the embodiment is suitable for manufacturing a liquid crystal panel having an alignment control mode, in which four alignment regions having mutually different oblique azimuths of the liquid crystal molecules are arranged along a longitudinal direction of the pixel as illustrated in FIG. 2. The liquid crystal panel having the new alignment control mode can be manufactured by the scanning exposure, so that production efficiency can greatly be improved. The term "substantial 45° or substantial 90° from the 45° azimuth" means a range of an angle of 15° clockwise or counterclockwise from 45° or 90° with respect to the 45° azimuth, respectively. The 45° azimuth and the 90° azimuth refer to a range of ±0.5° from 45° and 90°, respectively.

The rotation mechanism 264 can also rotate the polarization axis 231 of the polarizer 230 from the 45° azimuth to substantial 45°. When the polarization axis 231 is rotated by 45° from the 45° azimuth, the rotated polarization axis 231 is parallel to the light irradiation direction, so that the conventional photo alignment treatment in which the polarization axis of the polarizer is matched with the light irradiation direction can also be performed.

The stage 250 is a stage on which the liquid crystal panel substrate 30 is placed. The liquid crystal panel substrate 30 is fixed onto the stage 250, and the liquid crystal panel substrate 30 is irradiated with the light while the liquid crystal panel substrate 30 is moved, or the liquid crystal panel substrate 30 is irradiated with the light while the light source is moved with respect to the liquid crystal panel substrate 30. The photo alignment treatment can efficiently be performed by performing the scanning exposure. The light irradiation direction with respect to the liquid crystal panel substrate 30 is parallel to the movement direction of the liquid crystal panel substrate 30 or the movement direction of the light source 220, and an incident angle of light incident on the substrate from the light source becomes substantially the same in a light irradiation area of the light source, so that a pre-tilt angle (polar angle) provided to the liquid crystal molecules also becomes substantially the same. For this reason, a variation in pre-tilt angle can be suppressed in the light irradiation area to manufacture the liquid crystal panel having excellent display quality. The photo alignment treatment device 200 may include a stage scanning mechanism that moves the stage 250 and/or a light source scanning mechanism that moves the light source 220. The term "parallel" includes a range in which the angle formed between the light irradiation direction and the movement direction of the liquid crystal panel substrate 30 or the movement direction of the light source 220 is less than 5°.

The photo alignment treatment device 200 may include a light shielding member 240 in addition to the stage scanning mechanism and/or the light source scanning mechanism. The alignment division treatment can be performed by performing the photo alignment treatment while a portion that is not irradiated with the light is shielded by the light shielding member 240.

The use of the photo alignment treatment device can match the azimuth of the polarization axis of the polarizer with respect to the light irradiation direction with the exposure direction on the surface of the liquid crystal panel substrate to set the oblique azimuth of the liquid crystal molecules 41 in the liquid crystal panel 100 to the desired angle.

Figure 11:
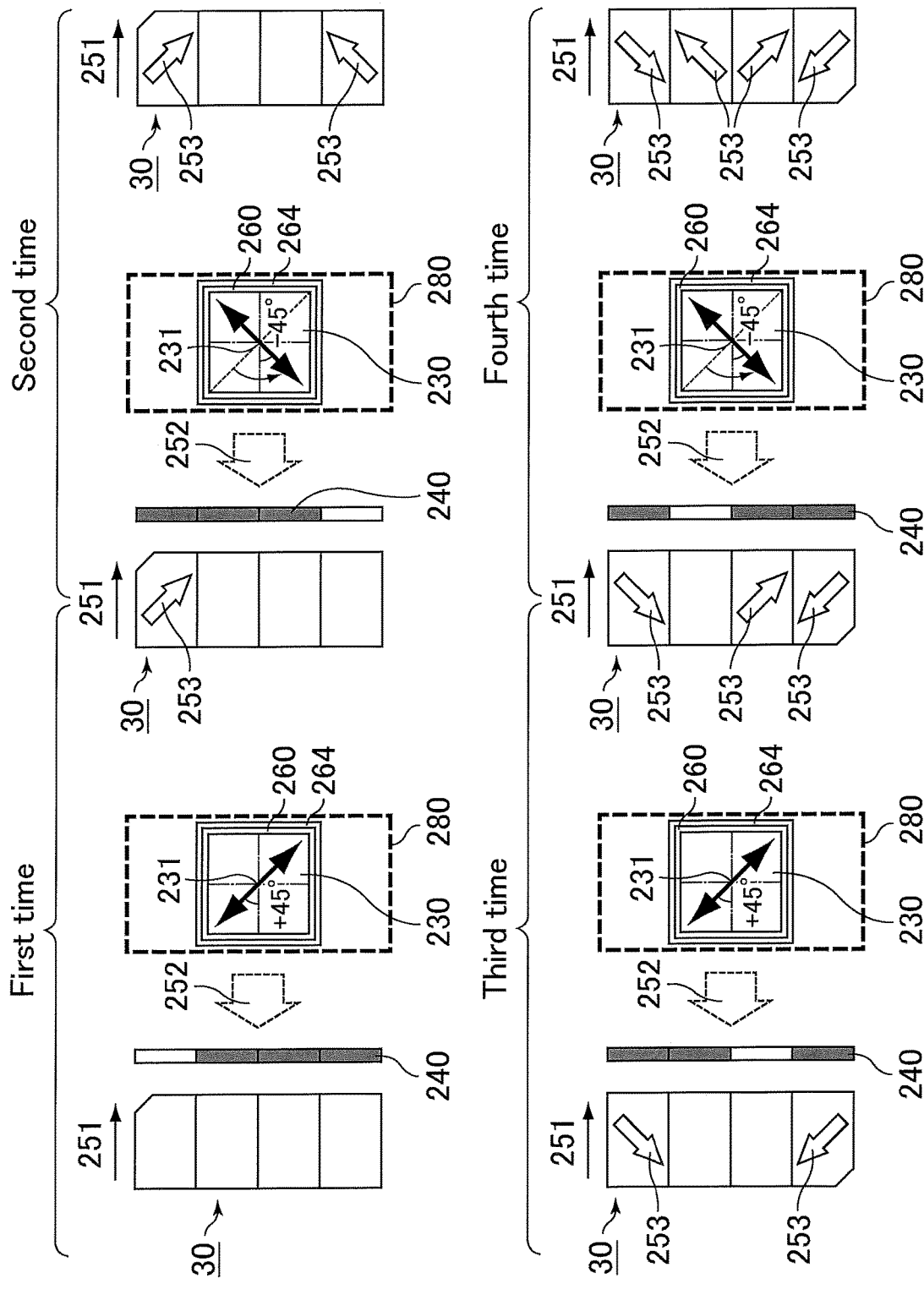
FIG. 11 is a view illustrating an example of a photo alignment treatment step using the photo alignment treatment device.

An example of a photo alignment treatment step using the photo alignment treatment device 200 will be described below with reference to FIG. 11. FIG. 11 is a view illustrating an example of the photo alignment treatment step using the photo alignment treatment device. The photo alignment treatment step in FIG. 11 is an example in which, using the light irradiation mechanism 280 including one polarizer 230, the polarization axis 231 of the polarizer 230 is rotated by the rotation mechanism 264 to perform the photo alignment treatment. In FIG. 11, in order to describe the azimuth of the liquid crystal panel substrate 30, a notch is illustrated in one corner. However, the actual liquid crystal panel substrate 30 may not include the notch.

As illustrated in FIG. 11, the movement direction 251 of the liquid crystal panel substrate 30 is set to the first direction, the light irradiation direction 252 is set to the second direction, and the first-time light irradiation is performed through the wavelength selection filter 235 (not illustrated) and the polarizer 230 using the light irradiation mechanism 280. The first direction and the second direction are parallel to each other. The region that is not irradiated with the light is shielded by the light shielding member 240. The polarization axis 231 of the polarizer 230 is set to the +45° azimuth clockwise with respect to the light irradiation direction 252, and then the rotation adjustment mechanism 260 adjusts the exposure direction 253 on the surface of the liquid crystal panel substrate 30 to substantial 45° with respect to the light irradiation direction 252 to perform the first-time light irradiation. Subsequently, the light shielding member 240 is moved, the polarization axis 231 of the polarizer 230 is rotated by 90° from the +45° azimuth by the rotation mechanism 264 and set to the −45° azimuth counterclockwise with respect to the light irradiation direction 252, and then the polarization axis 231 is adjusted by the rotation adjustment mechanism 260 to perform the second-time light irradiation. Subsequently, the substrate is rotated by 180°, the light shielding member 240 is further moved, the polarizer 230 is rotated by 90° from the −45° azimuth by the rotation mechanism 264 and set to the +45° azimuth, and then the polarization axis 231 is adjusted by the rotation adjustment mechanism 260 to perform the third-time light irradiation. Finally, the light shielding member 240 is moved, the polarizer 230 is rotated by 90° from the +45° azimuth by the rotation mechanism 264 and set to the −45° azimuth, and then the polarization axis 231 is adjusted by the rotation adjustment mechanism 260 to perform the fourth-time light irradiation. In the liquid crystal panel substrate 30 subjected to the light irradiation step, a pre-tilt azimuth 253 varies in each of regions corresponding to the four alignment regions formed in one pixel. The movement direction 251 and the light irradiation direction 252 of the liquid crystal panel substrate 30 are the same in all the first-time light irradiation to the fourth-time light irradiation. In all the first-time light irradiation to the fourth-time light irradiation, the polarization axis 231 is adjusted by the rotation adjustment mechanism 260 such that the exposure direction 253 on the surface of the liquid crystal panel substrate 30 becomes substantial 45° with respect to the light irradiation direction 252.

Figures 12A, 12B, 12C:
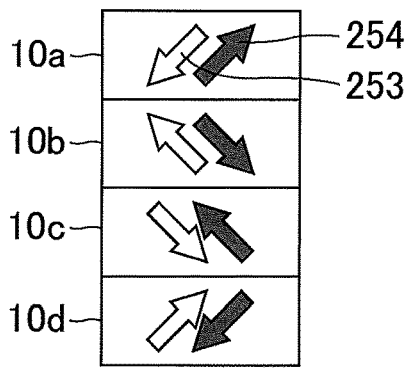
FIG. 12A is a view illustrating the photo alignment treatment performed on a TFT substrate (first substrate)
FIG. 12B is a view illustrating the photo alignment treatment performed on a CF substrate (second substrate)
FIG. 12C is a view illustrating a state after bonding of the TFT substrate and the CF substrate that are subject to the photo alignment treatment.

FIG. 12A is a view illustrating the photo alignment treatment performed on the TFT substrate (first substrate), FIG. 12B is a view illustrating the photo alignment treatment performed on the CF substrate (second substrate), and FIG. 12C is a view illustrating a state after bonding of the TFT substrate and the CF substrate that are subject to the photo alignment treatment; As illustrated in FIG. 12A, the TFT substrate (first substrate) 30 is subjected to the photo alignment treatment by changing the pre-tilt azimuth 253 in each domain by the first-time light irradiation to the fourth-time light irradiation. In the same manner as in the TFT substrate, as illustrated in FIG. 12B, the CF substrate (second substrate) 50 is also subjected to the photo alignment treatment by changing a pre-tilt azimuth 254 in each domain by the first-time light irradiation to the fourth-time light irradiation. As illustrated in FIG. 12C, the first domain 10a, the second domain 10b, the third domain 10c, and the fourth domain 10d that are included in the liquid crystal panel 100 of the embodiment are completed when the TFT substrate 30 and the CF substrate 50 that are subjected to the photo alignment treatment are bonded together.

[Additional Remarks]

According to one aspect of the present invention, there is provided a liquid crystal panel including, in the following order: a first substrate including multiple pixel electrodes arranged into a matrix form, multiple gate lines, and a first alignment film; a liquid crystal layer containing liquid crystal molecules; and a second substrate including a common electrode and a second alignment film, wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include multiple domains with different alignment vectors in a column direction in each display unit region superimposed on one of the pixel electrodes, in at least 30 pixels consecutive in a row direction, arrays of the domains are identical, the gate lines extend through a region between rows of the display unit regions, the domains in the display unit region located in an nth row, where n is any integer of 1 or more, are arranged in an order of a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction, each of the pixel electrodes is provided, in the first domain, the second domain, the third domain, and the fourth domain, with multiple fine slits parallel to the alignment vectors of the respective domains, each of the pixel electrodes includes a region where the fine slits do not exist, at both ends of the pixel electrode parallel to the row direction and at one or both of ends of the pixel electrode parallel to the column direction, and a portion having a largest width of the region where the fine slits do not exist is included in one or both of the ends of the pixel electrode parallel to the row direction.

In the above aspect, in a plan view of the display unit region located in the nth row, the alignment vector of the first domain and the alignment vector of the second domain may have a relationship in which the end points are opposed to each other and the alignment vectors are orthogonal to each other, the alignment vector of the second domain and the alignment vector of the third domain may have a relationship in which the start points are opposed to each other and the alignment vectors are parallel to each other, and the alignment vector of the third domain and the alignment vector of the fourth domain may have a relationship in which the end points are opposed to each other and the alignment vectors are orthogonal to each other.

The liquid crystal molecules may be aligned substantially vertically to the first substrate and the second substrate when no voltage is applied to the liquid crystal layer, and the liquid crystal molecules may obliquely be aligned so as to be matched with the alignment vectors of the domains when voltage is applied to the liquid crystal layer.

In the domains, an inter-substrate twist angle of the liquid crystal molecules may be less than or equal to 45°.

Each of the first domain, the second domain, the third domain, and the fourth domain may have a substantially rectangular shape.

The domains in the display unit region located in the (n+1)th row adjacent to the nth row with at least one of the gate lines interposed therebetween may satisfy a relationship in which the first domain and the fourth domain are located between the second domain and the third domain.

The domains in the display unit region located in the (n+1)th row may be arranged in the order of the third domain, the fourth domain, the first domain, and the second domain.

At least one of the first alignment film and the second alignment film may be a photo alignment film. Preferably both the first alignment film and the second alignment film are the photo alignment film.

According to another aspect of the present invention, there is provided a method of manufacturing the liquid crystal panel, the method including forming the fine slits by photolithography, the photolithography including irradiating a photosensitive resin formed on a conductive film with light through a mask in which a pattern corresponding to the fine slits is formed and multiple lenses.

What is claimed is:

1. A liquid crystal panel comprising, in the following order:
   a first substrate including multiple pixel electrodes arranged into a matrix form, multiple gate lines, and a first alignment film;
   a liquid crystal layer containing liquid crystal molecules; and
   a second substrate including a common electrode and a second alignment film,
   wherein an alignment vector is defined as being from a first substrate side long-axis end of each of the liquid crystal molecules, a start point, to a second substrate side long-axis end of the liquid crystal molecule, an end point, and the first alignment film and the second alignment film having been subjected to an alignment treatment each include multiple domains with different alignment vectors in a column direction in each display unit region superimposed on one of the pixel electrodes,
   in at least 30 pixels consecutive in a row direction, arrays of the domains are identical,
   the gate lines extend through a region between rows of the display unit regions,
   the domains in the display unit region located in an nth row, where n is any integer of 1 or more, are arranged in an order of a first domain in which a direction of the alignment vector is a first direction, a second domain in which a direction of the alignment vector is a second direction, a third domain in which a direction of the alignment vector is a third direction, and a fourth domain in which a direction of the alignment vector is a fourth direction,
   each of the pixel electrodes is provided, in the first domain, the second domain, the third domain, and the fourth domain, with multiple fine slits parallel to the alignment vectors of the respective domains,
   each of the pixel electrodes includes a region where the fine slits do not exist, at both ends of the pixel electrode parallel to the row direction and at one or both of ends of the pixel electrode parallel to the column direction, and
   a portion having a largest width of the region where the fine slits do not exist is included in one or both of the ends of the pixel electrode parallel to the row direction.

2. The liquid crystal panel according to claim 1, wherein in a plan view of the display unit region located in the nth row, the alignment vector of the first domain and the alignment vector of the second domain have a relationship in which the end points are opposed to each other and the alignment vectors are orthogonal to each other, the alignment vector of the second domain and the alignment vector of the third domain have a relationship in which the start points are opposed to each other and the alignment vectors are parallel to each other, and the alignment vector of the third domain and the alignment vector of the fourth domain have a relationship in which the end points are opposed to each other and the alignment vectors are orthogonal to each other.

3. The liquid crystal panel according to claim 1, wherein the liquid crystal molecules are aligned substantially vertically to the first substrate and the second substrate when no voltage is applied to the liquid crystal layer, and the liquid crystal molecules are obliquely aligned so as to be matched with the alignment vectors of the domains when voltage is applied to the liquid crystal layer.

4. The liquid crystal panel according to claim 1, wherein in the domains, an inter-substrate twist angle of the liquid crystal molecules is less than or equal to 45°.

5. The liquid crystal panel according to claim 1, wherein each of the first domain, the second domain, the third domain, and the fourth domain has a substantially rectangular shape.

6. The liquid crystal panel according to claim 1, wherein the domains in the display unit region located in an (n+1)th row adjacent to the nth row with at least one of the gate lines interposed therebetween satisfy a relationship in which the first domain and the fourth domain are located between the second domain and the third domain.

7. The liquid crystal panel according to claim 6, wherein the domains in the display unit region located in the (n+1)th row are arranged in an order of the third domain, the fourth domain, the first domain, and the second domain.

8. The liquid crystal panel according to claim 1, wherein at least one of the first alignment film or the second alignment film is a photo alignment film.

9. The liquid crystal panel according to claim 8, wherein both the first alignment film and the second alignment film are photo alignment films.

10. A method of manufacturing the liquid crystal panel according to claim 1, the method comprising
forming the fine slits by photolithography,
the photolithography including irradiating a photosensitive resin formed on a conductive film with light through a mask in which a pattern corresponding to the fine slits is formed and multiple lenses.

* * * * *